United States Patent [19]
Viteri

[11] Patent Number: 5,473,899
[45] Date of Patent: Dec. 12, 1995

[54] TURBOMACHINERY FOR MODIFIED ERICSSON ENGINES AND OTHER POWER/REFRIGERATION APPLICATIONS

[76] Inventor: Fermin Viteri, 3058 Kadema Dr., Sacramento, Calif. 95864

[21] Appl. No.: 74,383

[22] Filed: Jun. 10, 1993

[51] Int. Cl.$^6$ ............................................. F02C 1/10
[52] U.S. Cl. ..................... 60/684; 60/650; 60/39.4; 60/715; 62/402
[58] Field of Search ................... 60/682, 684, 715, 60/650, 39.43, 39.75; 415/77, 79; 62/401, 402

[56] References Cited

U.S. PATENT DOCUMENTS

| | | | |
|---|---|---|---|
| 2,514,875 | 7/1950 | Kollsman | 60/682 |
| 2,748,599 | 6/1956 | Keller | 60/650 |
| 3,256,691 | 6/1966 | Dobossy | 60/650 |
| 3,262,635 | 7/1966 | Smuland | 415/77 |
| 3,635,577 | 1/1972 | Dee | 415/79 |
| 3,699,681 | 10/1972 | Frutschi | 60/682 |
| 4,835,979 | 6/1989 | Murry et al. | 62/402 |
| 4,936,098 | 6/1990 | Nakhamkin | 60/684 |
| 5,224,339 | 7/1993 | Hayes | 60/39.43 |

FOREIGN PATENT DOCUMENTS

| | | | |
|---|---|---|---|
| 0634006 | 1/1949 | United Kingdom | 60/684 |
| 0000229 | 1/1990 | WIPO | 415/77 |

OTHER PUBLICATIONS

G. J. Van Wylen, *Fundamentals of Classical Thermo–dynamics*, John Wiley & Sons, New York, ©1985 pp. 333–335.

A Preliminary Study of the Modified Ericsson for Space Power, J. Berner and J. F. Louis, Energy Conf. Aug. 85.

Comparison of Gas–Turbine Cycles for Space Applications, Robert E. English and Henry O. Slone, Amer. Rocket Soc. Nov. 1960.

AGT101 Advanced Gas Turbine Technology Update J. R. Kidwell, D. M. Kreiner and R. A. Rackley, ASME 84–GT–166.

Introduction to the Gas Turbine, D. G. Shepherd D. Von Nostrand Co. Inc., 2nd Edition 1960 pp. 16–73.

The Design of High Efficiency Turbomachinery and Gas Turbines, D. G. Wilson, The MIT Press (1984) pp. 101–131.

Catalog Picture—Two Stage Supercharging Module, Hispano Suiza, Turbocharger DIV.

Drawing of Japanese Air Turbo–Rocket.

*Primary Examiner*—James C. Yeung
*Assistant Examiner*—L. Heyman
*Attorney, Agent, or Firm*—Bradley P. Heisler

[57] ABSTRACT

This disclosure is the use of high efficiency turbomachinery designs to achieve high efficiency thermodynamic cycles. The high efficiency thermodynamic cycles are referred to as the Modified Ericsson cycles, an expansion of the regenerative Brayton cycle. A Modified Ericsson cycle can include 2,3,4, or more stages (number of intercooling and heat/reheat cycles between stages) that achieve higher efficiencies and power density (net output power/cycle weight flow rate) than those of regenerative and nonregenerative Brayton cycles. Also included is a high temperature tip-turbine driven compressor design for Brayton, Modified Ericsson and other power/refrigeration cycles.

21 Claims, 18 Drawing Sheets

MODIFIED ERICSSON ENGINE SCHEMATIC

CYCLE EFFICIENCY FOR BRAYTON AND ERICSSON CYCLES

COMPRESSOR POWER COEFFICIENT:

$$CPC = \frac{P_C}{\frac{778}{550} C_P T_{MIN}} = \frac{P_{RS}^{\alpha} - 1}{\eta_C}$$

TURBINE POWER COEFFICIENT WHEN $\epsilon = 1$:

$$TPC = \frac{P_T}{\frac{778}{550} C_P T_{MIN}} = \eta_T T_R \left[\frac{(KP_{RS})^{\alpha} - 1}{(KP_{RS})^{\alpha}}\right]$$

TURBINE POWER COEFFICIENT WHEN $\epsilon < 1$:

$$TPC' = \epsilon TPC + (1 - \epsilon)\left[T_R - 1 - CPC\right]$$

SPECIFIC POWER COEFFICIENT FOR n STAGES:

$$SPC = n(TPC - CPC) \quad \text{—} \quad 59$$

INPUT POWER COEFFICIENT FOR n STAGES:

$$IPC = TPC' + (n-1)TPC = nTPC + (1 - \epsilon)(T_R - 1 - CPC - TPC)$$

CYCLE EFFICIENCY – $\eta$:

$$\eta = \frac{SPC}{IPC} \quad \text{—} \quad 58$$

WHERE:
- $\alpha = \frac{\gamma - 1}{\gamma}$
- $\gamma$ – GAS SPECIFIC HEAT RATIO
- $C_P$ – GAS SPECIFIC HEAT RATIO @ CONSTANT PRESSURE
- $T_R = T_{MAX}/T_{MIN}$
- $P_{RS}$ – STAGE PRESSURE RATIO
- $\eta_C$ – COMPRESSOR EFFICIENCY
- $\eta_T$ – TURBINE EFFICIENCY
- $\epsilon$ – REGENERATOR EFFECTIVENESS
- $K = \left(1 - \frac{\Delta P_{LOSS}}{P}\right)$ PRESSURE LOSS COEFFICIENT
- $P_C$ – COMPRESSOR SPECIFIC POWER, $\frac{SHP}{LB/SEC}$
- $P_T$ – TURBINE SPECIFIC POWER, $\frac{SHP}{LB/SEC}$
- n – No. OF INTERCOOLINGS, HEAT/REHEATS (STAGES)

NOTE:

| n | $\epsilon$ | EFFICIENCY |
|---|---|---|
| 1 | 1 | MODIFIED ERICSSON STAGE |
| 1 | <1 | REGENERATIVE BRAYTON |
| 1 | 0 | NONREGENERATIVE BRAYTON |

*Fig. 3B*

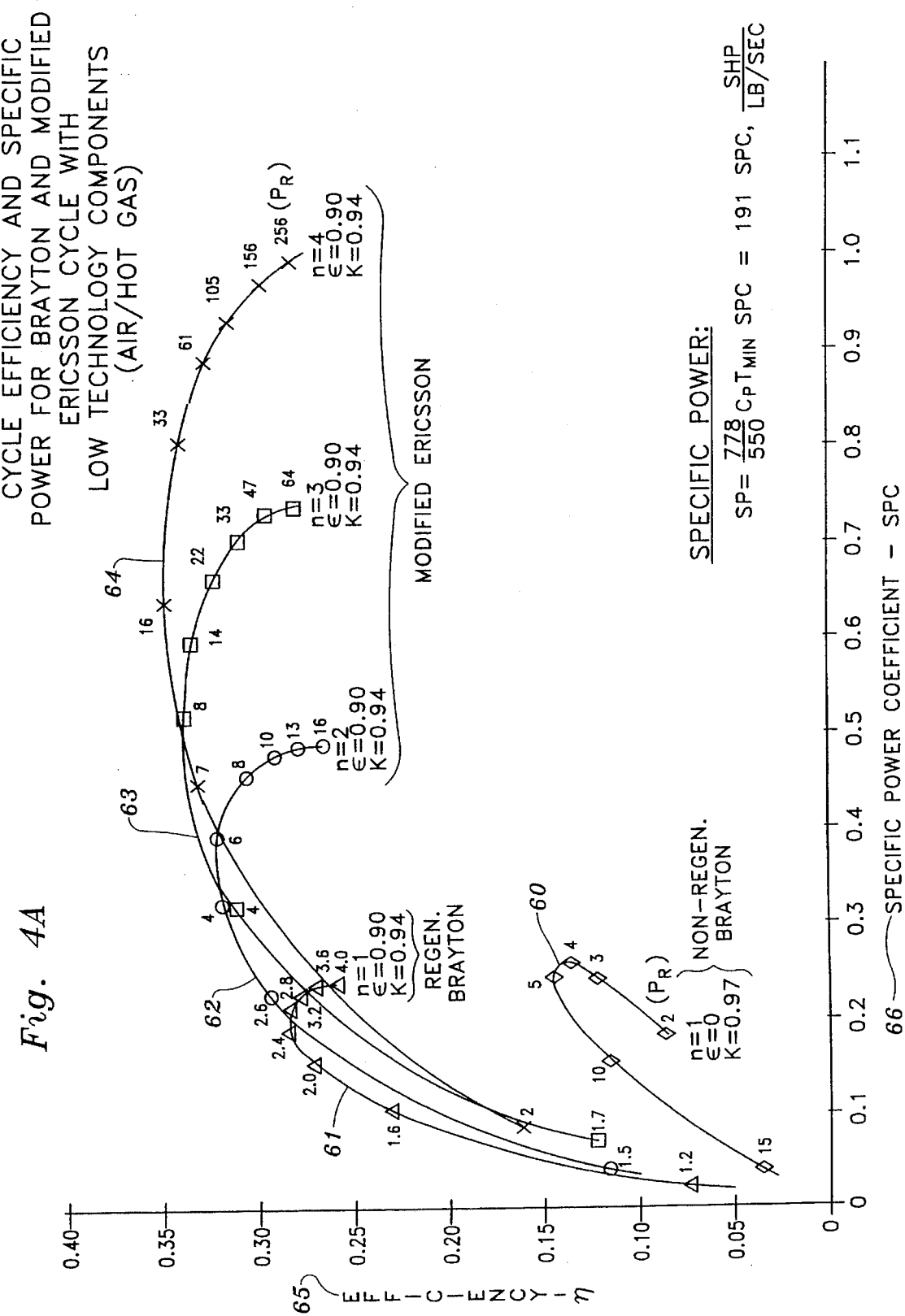

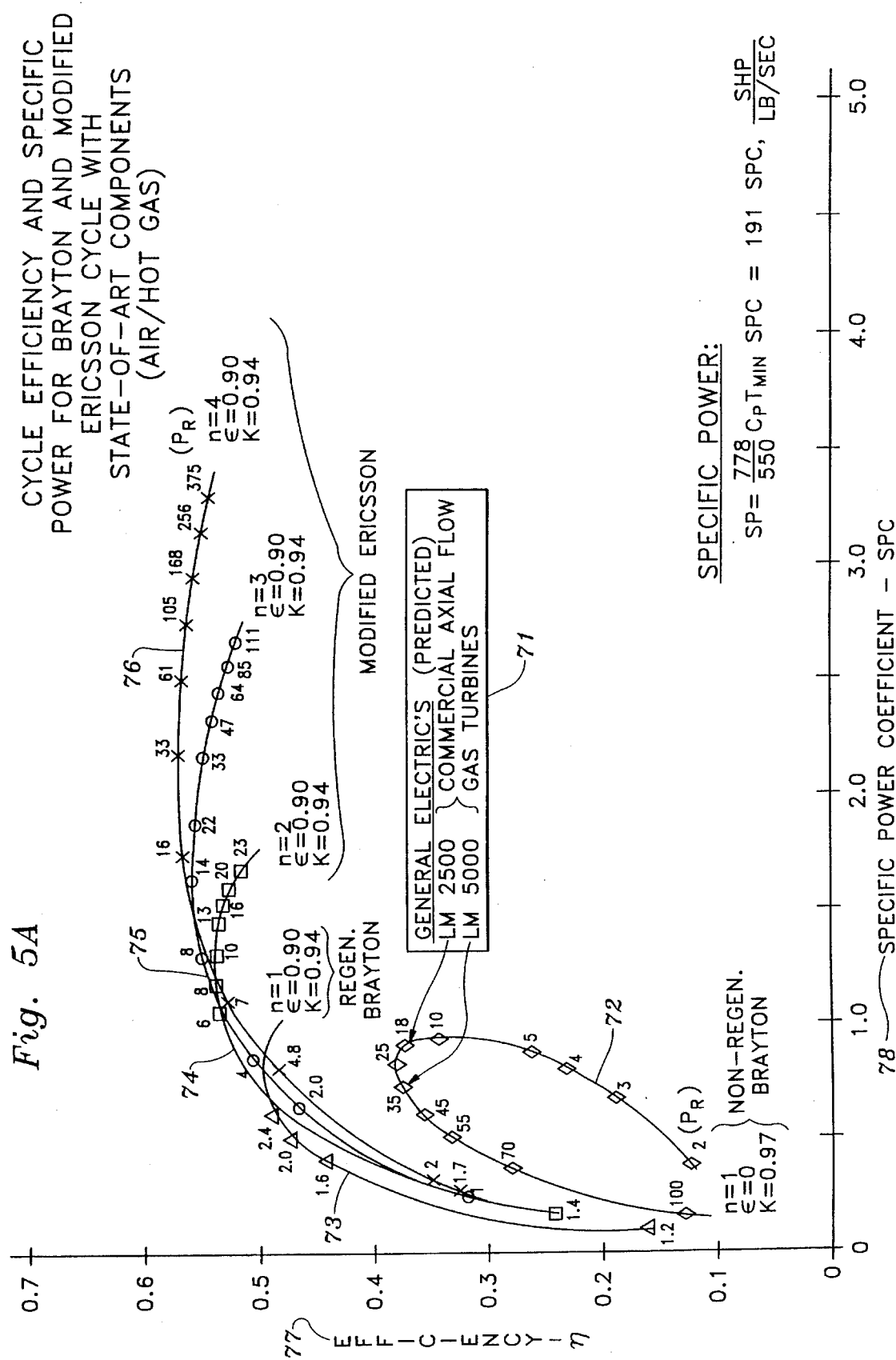

CYCLE EFFICIENCY AND SPECIFIC POWER FOR BRAYTON AND MODIFIED ERICSSON CYCLE WITH ADVANCED TECHNOLOGY/COMPONENTS (AIR/HOT GAS)

ASSUMPTIONS FOR GRAPH IN Fig. 6A _88_

$T_{MAX} = 3000°R$
$T_{MIN} = 519°R$
$\gamma = 1.37$ SPECIFIC HEAT RATIO
$\eta_C = 0.85$ COMPRESSOR EFFICIENCY
$\eta_T = 0.90$ TURBINE EFFICIENCY
$K = 1 - \dfrac{\Delta P_{LOSSES, LINE LOSSES, ETC.}}{P}$
$\epsilon$ – REGENERATOR EFFECTIVENESS
$n$ – No. OF INTERCOOLINGS, HEAT/REHEAT STAGES
$P_R$ – OVERALL PRESSURE RATIO
$P_{RS} = P_R^{1/n}$ STAGE PRESSURE RATIO
$C_P = 0.26$ BTU/LB°R GAS SPECIFIC HEAT

*Fig. 6B*

CYCLE EFFICIENCY AND SPECIFIC POWER FOR BRAYTON AND MODIFIED ERICSSON CYCLE WITH STATE-OF-ART COMPONENTS (AIR/HOT GAS)

ASSUMPTIONS FOR GRAPH IN Fig. 5A _79_

$T_{MAX} = 2600°R$
$T_{MIN} = 519°R$
$\gamma = 1.37$ SPECIFIC HEAT RATIO
$\eta_C = 0.80$ COMPRESSOR EFFICIENCY
$\eta_T = 0.90$ TURBINE EFFICIENCY
$K = 1 - \dfrac{\Delta P_{LOSSES, LINE LOSSES, ETC.}}{P}$
$\epsilon$ – REGENERATOR EFFECTIVENESS
$n$ – No. OF INTERCOOLINGS, HEAT/REHEAT STAGES
$P_R$ – OVERALL PRESSURE RATIO
$P_{RS} = P_R^{1/n}$ STAGE PRESSURE RATIO
$C_P = 0.26$ BTU/LB°R GAS SPECIFIC HEAT

*Fig. 5B*

CYCLE EFFICIENCY AND SPECIFIC POWER FOR BRAYTON AND MODIFIED ERICSSON CYCLE WITH LOW TECHNOLOGY/COMPONENTS (AIR/HOT GAS)

ASSUMPTIONS FOR GRAPH IN Fig. 4A _67_

$T_{MAX} = 1860°R$
$T_{MIN} = 519°R$
$\gamma = 1.37$ SPECIFIC HEAT RATIO
$\eta_C = 0.75$ COMPRESSOR EFFICIENCY
$\eta_T = 0.80$ TURBINE EFFICIENCY
$K = 1 - \dfrac{\Delta P_{LOSSES, LINE LOSSES, ETC.}}{P}$
$\epsilon$ – REGENERATOR EFFECTIVENESS
$n$ – No. OF INTERCOOLINGS, HEAT/REHEAT STAGES
$P_R$ – OVERALL PRESSURE RATIO
$P_{RS} = P_R^{1/n}$ STAGE PRESSURE RATIO
$C_P = 0.26$ BTU/LB°R GAS SPECIFIC HEAT

*Fig. 4B*

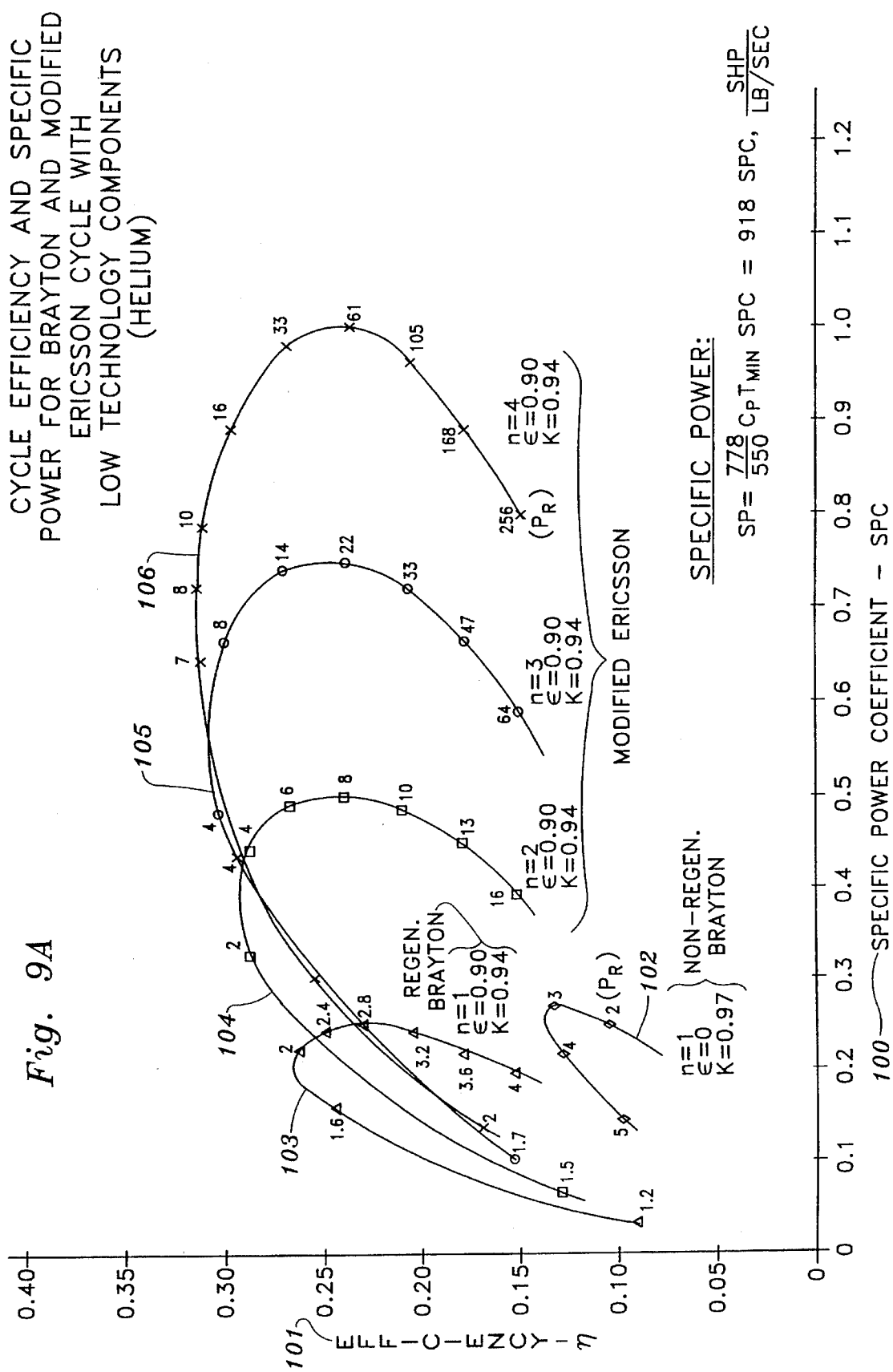

CYCLE EFFICIENCY AND SPECIFIC POWER FOR BRAYTON AND MODIFIED ERICSSON CYCLE WITH LOW TECHNOLOGY COMPONENTS (HELIUM)

ASSUMPTIONS FOR GRAPH IN Fig. 9A ─107

$T_{MAX} = 1860°R$ $T_{MIN} = 519°R$ $\gamma = 1.659$ SPECIFIC HEAT RATIO $\eta_C = 0.75$ COMPRESSOR EFFICIENCY $\eta_T = 0.80$ TURBINE EFFICIENCY $K = 1 - \dfrac{\Delta P_{LOSSES, \text{ LINE LOSSES, ETC.}}}{P}$ $\epsilon$ – REGENERATOR EFFECTIVENESS $n$ – No. OF INTERCOOLINGS, HEAT/REHEAT STAGES $P_R$ – OVERALL PRESSURE RATIO $P_{RS} = P_R^{1/n}$ STAGE PRESSURE RATIO $C_P = 1.25$ BTU/LB°R GAS SPECIFIC HEAT

*Fig. 9B*

CYCLE EFFICIENCY AND SPECIFIC POWER FOR BRAYTON AND MODIFIED ERICSSON CYCLE WITH ADVANCED TECHNOLOGY COMPONENTS (HELIUM)

ASSUMPTIONS FOR GRAPH IN Fig. 10A ─117

$T_{MAX} = 3000°R$ $T_{MIN} = 519°R$ $\gamma = 1.659$ SPECIFIC HEAT RATIO $\eta_C = 0.85$ COMPRESSOR EFFICIENCY $\eta_T = 0.90$ TURBINE EFFICIENCY $K = 1 - \dfrac{\Delta P_{LOSSES, \text{ LINE LOSSES, ETC.}}}{P}$ $\epsilon$ – REGENERATOR EFFECTIVENESS $n$ – No. OF INTERCOOLINGS, HEAT/REHEAT STAGES $P_R$ – OVERALL PRESSURE RATIO $P_{RS} = P_R^{1/n}$ STAGE PRESSURE RATIO $C_P = 1.25$ BTU/LB°R GAS SPECIFIC HEAT

*Fig. 10B*

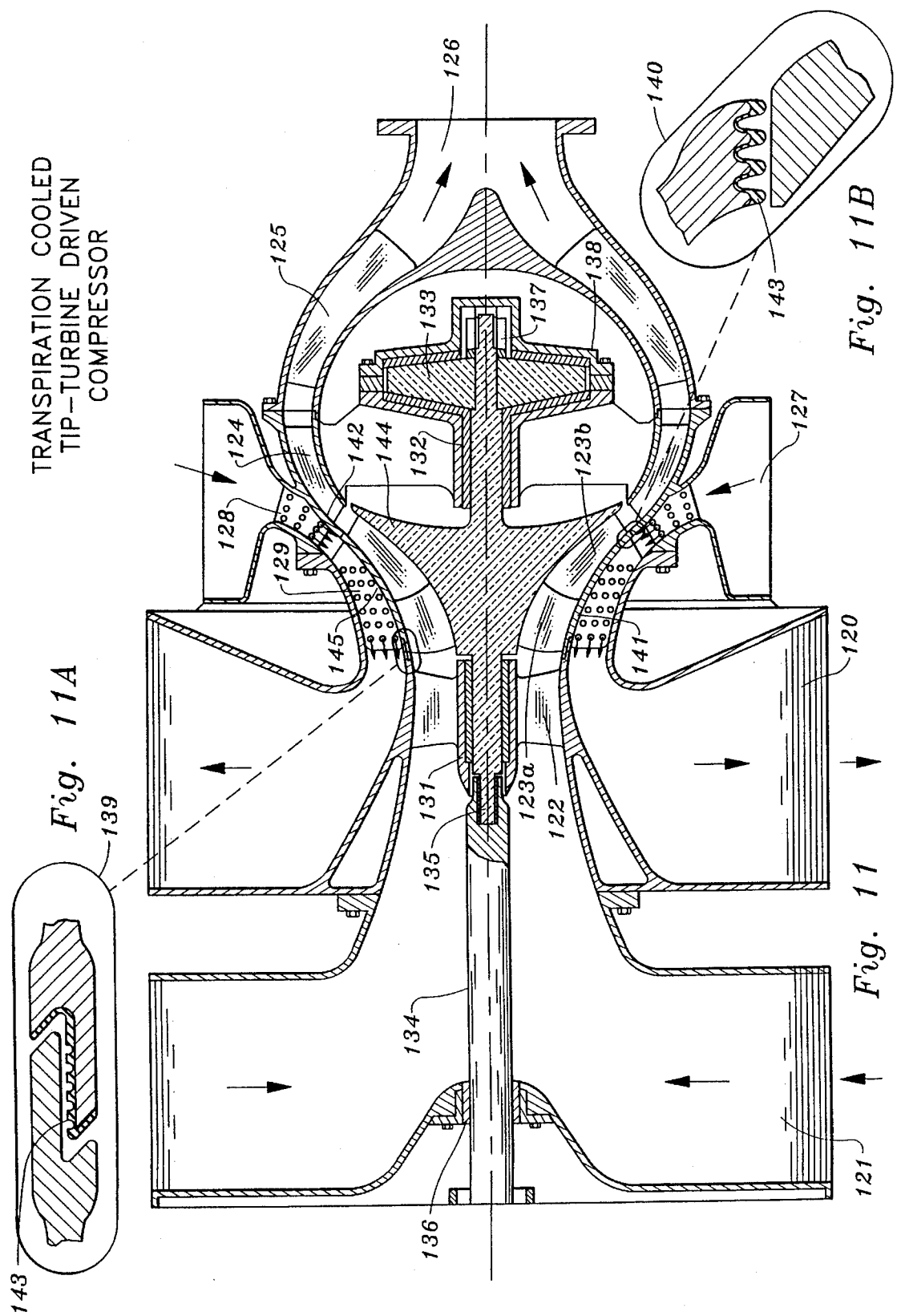

TRANSPIRATION COOLED TIP-TURBINE DRIVEN TWO STAGE COMPRESSOR

TWO STAGE MODIFIED ERICSSON ENGINE WITH TIP-TURBINE DRIVEN COMPRESSORS FOR REFRIGERATION – CLOSED CYCLE

FOUR STAGE MODIFIED ERICSSON ENGINE WITH TIP-TURBINE DRIVEN COMPRESSORS FOR POWER GENERATION — OPEN CYCLE

AUTOMOTIVE/DIESEL
SUPER CHARGING

TURBOMACHINERY FOR MODIFIED ERICSSON ENGINES AND OTHER POWER/REFRIGERATION APPLICATIONS

SUMMARY OF THE INVENTION

The present invention provides a practical and effective means of achieving the Modified Ericsson cycle with the use of low technology as well as advanced technology components that are integrated into various optional systems for power, efficiency, and size considerations.

Another object of the invention is to provide a self-contained power system capable of also using various component technology levels for producing high pressure gas, primarily for refrigeration applications. An advantage of this self-contained power system is the use of a portion of the high pressure gas being produced, as the turbocompressor drive gas. Thus, large low speed drive motors and gearboxes normally used for the compressors are eliminated.

Another object of the invention is to provide a high temperature tip-turbine driven compressor design for use in Brayton, Modified Ericsson and other power/refrigeration applications.

The above and other features of this invention will be more fully understood from the following detailed description of the engine and turbo-compressor design; a discussion of their benefits; and the accompanying drawings.

BACKGROUND OF THE INVENTION

1. Field of the Invention

The present invention relates to high efficiency turbomachinery and the integration of this turbomachinery into high efficiency thermodynamic cycles. In particular the Brayton and the Modified Ericsson cycles. This invention also includes the design of a high temperature tip-turbine driven centrifugal compressor that integrates well into Brayton and Modified Ericsson cycles.

2. Description of Related Art

The subject invention pertains to the design, the selection of high efficiency turbomachinery, and the integration of this turbomachinery into high efficiency thermodynamic cycles for: (1) power generation in space or on earth; (2) drive motors for vehicles, ships, trains and other modes of transportation; and (3) refrigeration applications such as helium liquefication for superconductivity, cryogenic fluid production, cooling of computers and electronic equipment, and air-conditioning. Current thermodynamic cycles being used for these applications include the Stirling, Rankine, Otto, Diesel and Brayton. Although the Ericsson cycle is often considered, it is usually abandoned because the added complexity of the turbomachinery and the need for many additional components, discourages its use. All these cycles except for the Ericsson cycle, have been highly developed over the past century and are widely used today. The Ericsson cycle, however, remains attractive because it can, like the Stirling, ideally achieve Carnot efficiencies when operated between given upper and lower temperature limits. The Carnot cycle is the most efficient cycle conceivable and forms a basis of comparison to other cycles. In practice, however, a Carnot engine is considered impractical because its size-to-power ratio is unfavorable when compared to modern engines. The Stirling cycle uses positive displacement type of machinery which has size limitations. The Modified Ericsson cycle, however, can use both, positive displacement for lower power levels, and high speed rotating axial and centrifugal flow type machinery at the higher power levels. The high speed rotating machinery has higher efficiency capability and higher power-to-weight ratios than the positive displacement type.

The Modified Ericsson approximates the Ideal Ericsson isothermal compression by using multiple stages of compression, with intercooling between stages, and the isothermal expansion by using multi-turbine stages, with reheat between stages. Therefore, many low pressure stages are beneficial, and ideally, the Modified Ericsson cycle approaches Carnot efficiencies with infinite number of stages as the pressure ratio per stage approaches one (1). Basically, the Modified Ericsson cycle is and expansion of the regenerative Brayton cycle, however, the specific power (net power/weight flow rate) increases proportionately as stages are added, without the need for additional regenerators. The regenerator is a critical component of a regenerative cycle because of its large size and high regeneration efficiency requirements, and any reduction to its size is highly desirable.

In summary, the significant advantages of Modified Ericsson engines over that of regenerative and nonregenerative Brayton, in addition to higher efficiency, is the increased specific power. For a given power, the higher specific power of the Modified Ericsson engine reduces the gas flow rate requirement proportionately and in turn the component sizes and weights.

The subject invention also pertains to the design of a high temperature tip-turbine driven compressor than can incorporate transpiration cooled turbine blades. The turbine blades or entire rotor could also be fabricated from a high temperature ceramic material such as silicon carbide, silicon nitride etc. The design also locates the bearing in an ambient temperature environment and eliminates heat-soak-back and oil lubrication coking problems.

Applications for turbocompressors of this type design include gas turbine and refrigeration power cycles that demand the highest turbine and compressor efficiencies possible with modest pressure rise requirements such as regenerative Brayton and Modified Ericsson cycles. Automotive superchargers is another application where moderate pressure rise compressors and high temperature turbines are required.

Most current gas turbines with cooled blades, such as aircraft derivative commercial type LM2500, 5000, and 6000, rely on blade root convection cooling using compressor discharge air. Such designs have been very successful and are widely used for commercial power plants. These designs, however, require very advanced technology and take years to develope with very large investment demands.

The subject design is considered more rugged, simpler to design and develop, and adapts well to land based power generation and refrigeration applications. Also, the subject design is better suited for ceramic application because the blades are bigger, and have large leading and trailing edges for ease of casting. In addition, the rotor tip-speeds and resulting stresses do not have to be as high as aircraft type designs since the need for light weight components is not critical for land based units.

Other benefits of the ruggedness of the subject design could be applied to coal burning and geothermal power plants where particulates in the gas can cause severe blade erosion of the leading and trailing edges of turbine and compressor blades with small radii and thus result in rapid loss of power plant efficiency. The use of large rugged thick ceramic blading of the subject design could extend replacement time of such units considerably.

BRIEF DESCRIPTION OF THE DRAWINGS

FIG. 4 is a graph illustrating performance characteristics of Brayton and Modified Ericsson cycles for air/hot-gas utilizing low technology components.

FIG. 5 is a graph illustrating performance characteristics of Brayton and Modified Ericsson cycles for air/hot-gas utilizing state-of-the-art component technology.

FIG. 9 is a graph illustrating the performance characteristics of Brayton and Modified Ericsson cycles for helium utilizing low technology components.

FIG. 11 is a full sectional view of a transpiration cooled or ceramic tip-turbine driven single stage compressor(an embodiment of this invention).

DESCRIPTION OF THE PREFERRED EMBODIMENTS

Figure 1:
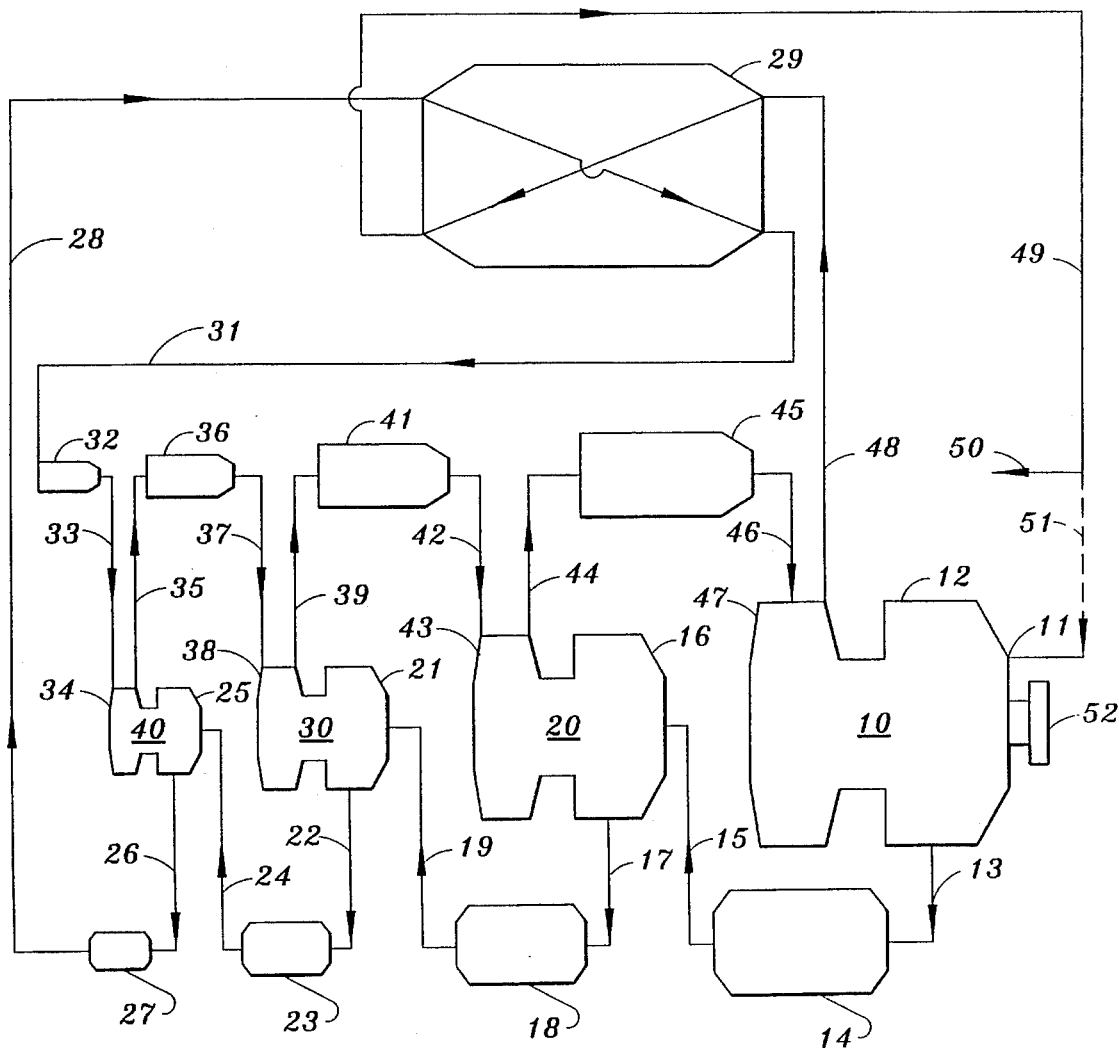
FIG. 1 is a schematic view illustrating a multi-stage Modified Ericsson Engine according to the subject invention.

According to one embodiment of the present invention, a Multi-stage Modified Ericsson Engine (MMEE), FIG. 1, consists of four (4) independent, turbine-driven compressors, operating in series. These turbocompressors stage 1, 10, stage 2, 20, stage 3, 30, and stage 4, 40 are aerodynamically coupled (similar to multi-shaft aircraft gas turbines) and each can operate at or near its optimum speed (N) and corresponding specific speed ($N_s$), to achieve maximum efficiency, FIG. 2. Specific speed is an aerodynamic/hydraulic flow characteristic of rotating and positive displacement machinery, i.e., compressors, turbines, and pumps, and is defined as:

$$N_s = N * Q^{½} / H^{¾}$$

WHERE: (compressor/turbine)

N-speed

Q-volume flow rate (inlet/exit)

H-head (rise/drop)

Since the pressure rise (head rise, H) for each compressor and the pressure drop (head drop, H) for each turbine are all approximately the same, the turbocompressor speed (N) must increase as the volume flow rate decreases, with increasing pressure rise per stage, in order to maintain constant specific speed, i.e., design similarity. Also, as speed increases, the turbocompressor size decreases proportionately, to maintain constant rotor tip-speed and corresponding rotor stresses.

As a result of these relationships the MMEE shown in FIG. 1, can achieve higher cycle efficiencies and much higher specific power (also called power density) at higher power to weight ratios than those possible with regenerative Brayton (RB) and non-regenerative Brayton (NRB) cycles utilizing various levels of component technology. These higher performance characteristics will be discussed in the following section.

Engine operation begins as gas flow enters the stage 1 compressor 12, FIG. 1, through inlet duct 11 and raised to its design discharge pressure; it exits through duct 13 into the stage 1 intercooler 14 where the heat of compression is removed by external cooling means, i,e., air water, Freon, or radiation to deep space. After the gas exits stage 1 intercooler 14 through duct 15 at a temperature equal to the stage 1 compressor inlet 11, it enters the stage 2 compressor 16 and raised to its design pressure. The gas then exits through duct 17 into stage 2 intercooler 18 and cooled to the inlet temperature of stage 2 compressor 16 inlet. This compression/cooling cycle is repeated as the gas flows through inlet duct 19, compressor 21, exit duct 22, intercooler 23 of stage 3, 30; and inlet duct 24, compressor 25, exit duct 26, and intercooler 27 of stage 4, 40, to complete the pressurizing and cooling phase of the cycle. This phase can include 2, 3, 4 or more stages depending upon the design over-all pressure ratio, the pressure rise per stage considered optimum for high cycle efficiency, and the rotor stress limits set by material strength and rotor tip-speeds.

Note, the last intercooler 27 could be located at the stage 1 compressor inlet 11 for closed cycles, however, its size and weight would increase because the lower pressure gas requires larger flow areas to maintain constant velocities and larger heat transfer surface area due to lower heat transfer coefficients on the gas side. For open cycles, intercooler 27 can be eliminated.

After the gas is cooled by intercooler 27, to the inlet temperature of the stage 4 compressor 25, it exits through duct 28 and enters the regenerator 29 where heat is absorbed from the exhaust gas exiting the stage 1 turbine 47. The gas then exits through duct 31 into the stage 4 heater 32, where additional heat is added until the maximum allowable operating temperature is reached. The high pressure hot gas exits through duct 33 and drives the stage 4 turbine 34, connected to the stage 4 compressor 25. The hot gas exhausts through duct 35, and enters the stage 3 reheater 36, where the heat extracted by the stage 4 turbine 34, is replenished. The gas is again heated to its maximum allowable temperature and exits through duct 37 to drive the stage 3 turbine 38, connected to the stage 3 compressor 21. The exhaust gas exits through duct 39 and enters the stage 2 reheater 41, where it is again reheated to its maximum allowable temperature. It then exits through duct 42 and drives the stage 2 turbine 43 connected to the stage 2 compressor 16. Turbine exhaust gas then exits through duct 44 and enters the stage 1 reheater 45, where gas is again heated to its maximum allowable temperature; exists through duct 46 and drives the stage 1 turbine 47 connected to the stage 1 compressor 12. The stage 1 turbine 47 exhaust gas exits through duct 48 and enters the regenerator 29 where it gives up its heat, as noted above, to the high pressure gas exiting intercooler 27 and duct 28. The gas exiting through duct 49 can either discharge to the atmosphere through duct 50 to complete an "open-cycle" (used with air/fuel), or it can return back to the stage 1 compressor inlet 11 through duct 51, where it begins a new cycle (used with helium, nitrogen and etc.).

The net output power produced by the cycle is shown being extracted by the output shaft 52 of the stage 1 turbine 47. However, several other methods can be used including: (1) a separate lower temperature, low pressure ratio power turbine (not shown) placed in the stage 1 turbine exhaust duct 48; or (2) a separate higher temperature, high pressure ratio power turbine (not shown) that extracts a portion of the high temperature, high pressure gas from the stage 4 heater exit duct 33 and exhausts into the stage 1 turbine exhaust duct 48. Either one of these options would not impact the cycle efficiency or specific power of the MMEE discussed above. When using the later two types of power output methods (separate power turbine), the MMEE then becomes a gas generator for use with both, open or closed cycle "free" power turbine(s).

The turbocompressors 10,20,30,40 speeds are controlled by the addition or heat generation rate (air/fuel combustor) of heater 32 and reheaters 36,41,45. In addition, valves, compressor variable inlet guide vanes, or other flow control devices (not shown) can be used for speed control as operational requirements demand.

Figure 2:
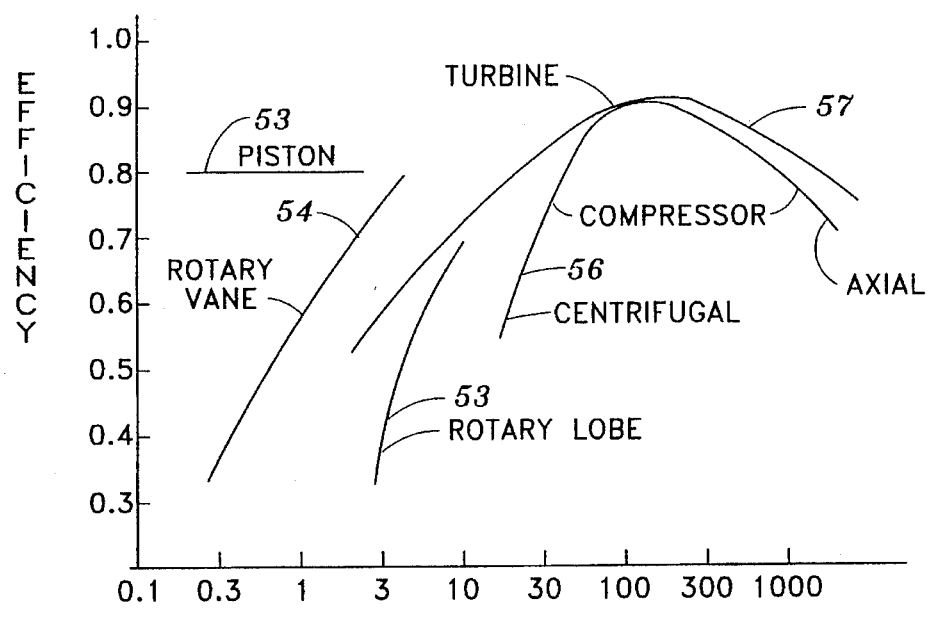
FIG. 2 is a graph illustrating efficiencies of compressors and turbines as a function of their specific speed parameter.

Various types of compressor and turbine designs can be used for the MMEE turbocompressors 10,20,30,40 FIG. 1. For low power levels (<500 SHP), the positive displacement type piston 53, rotary vane 54, and rotary lobe 55, FIG. 2, are more efficient and easier to develope for smaller size units. However, as power and size increase, the centrifugal and axial flow compressor 56, and turbine 57, become more efficient. In addition, as size increases these units have higher power-to-weight ratio capability over the positive displacement type.

Figure 3A:
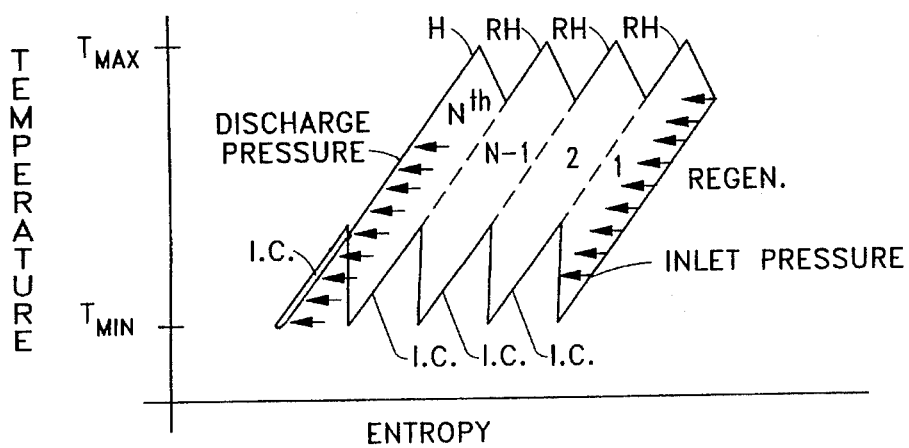
FIG. 3 is a graph with calculations illustrating the general cycle efficiency equation and specific power coefficient equation for Brayton and Modified Ericsson cycles.

The advantages of MMEE over both the RB and NRB engines can be demonstrated by using the results from the cycle efficiency 58 and specific power coefficient (SPC) 59 equations shown in FIG. 3. A comparison of MMEE and Brayton performances, for low technology components 67 using air/hot gas (gas turbine), is illustrated in FIG. 4. Under these conditions the NRB 60 efficiencies are shown to be non-competitive (<15%) while those of the RB 61 (29%) and MMEE 62,63,64 (32% to 35%) are comparable to commercial NRB gas turbines 71. The SPC must be greater than about 0.8 to be competitive with commercial gas turbines, 71 FIG. 5. Therefore, with low technology components only the MMEE's are viable candidates, while the RB 61 engine is considered marginal with its efficiency of 29%, and low SPC of less than 0.26.

MMEE and Brayton performances using state-of-the-art components 79 (air/hot gas) are illustrated in FIG. 5. At these conditions the NRB engine 72 shows current commercial aircraft gas turbine industry standards 71 of 37% to 42% efficiency and SPC of 0.80 to 0.95. The predicted efficiency and SPC using MMEE's 74,75,76 is 57% efficiency and SPC up to 3.+. Current NRB commercial engines, such as the LM 2500, 5000 and 6000 71, can be coupled with a steam bottoming cycle to recover the turbine exhaust heat. Such systems predict thermal efficiencies in the mid 50% range and thus campare to those of MMEE 74, 75, 76. However, the estimated SPC increase from 1.0 to approximately 1.3 for these NRB's 72 is still well below that developed by the MMEE 75,76, of 2.+for similar pressure ratios of 30:1 (LM 5000/6000 range).

Figure 6A:
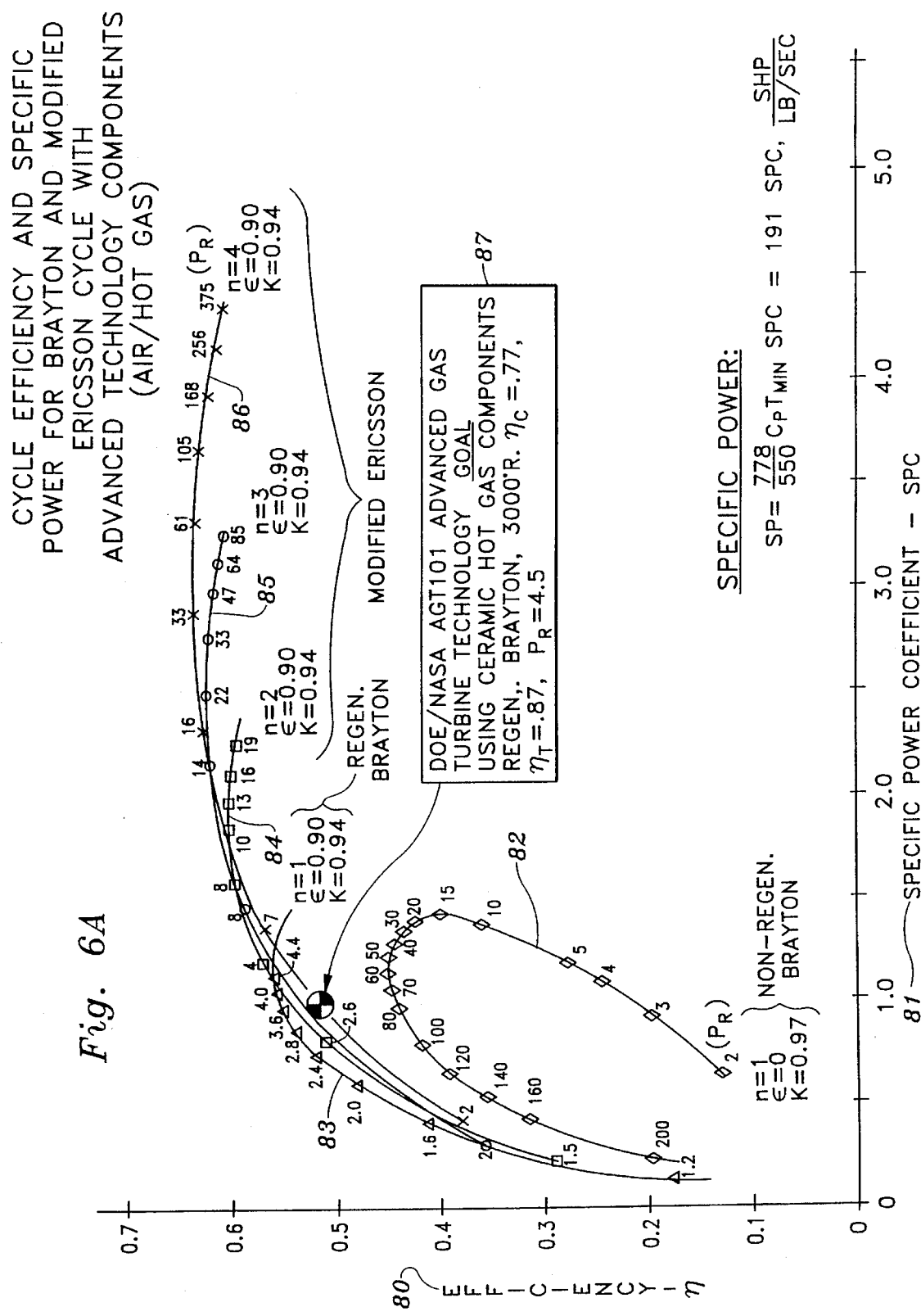
FIG. 6 is a graph illustrating performance characteristics of Brayton and Modified Ericsson cycles for air/hot-gas utilizing advanced technology components.

Finally, the performance for MMEE and Brayton using advanced technology components 88, is presented in FIG. 6. Here again the MMEE 84,85,86 show higher performance over RB 83 and NRB 82 with efficiencies greater than 63% and SPC that exceeds 4.0. For reference, the government funded research program for advanced gas turbine technology 87 is included. Note the compressor and turbine efficiencies 87 are lower than those used in the assumptions 88 because the specific speeds, $N_s$, of these units are lower than optimum for maximum efficiency.

Figure 7:
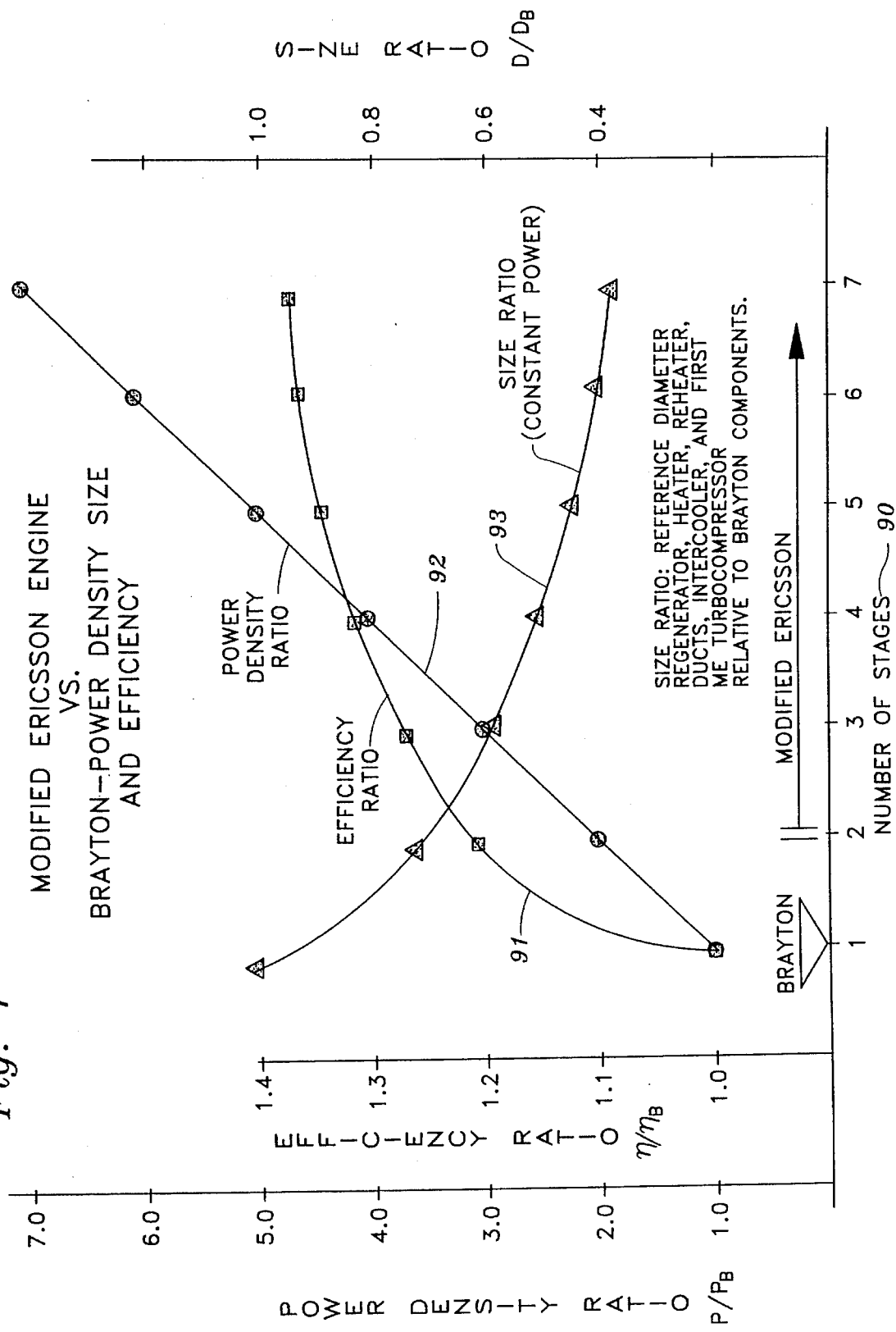
FIG. 7 is a graph illustrating the performance improvement of Modified Ericsson over regenerative Brayton cycle for advanced technology components.

Using the results from FIG. 6, the advantages of MMEE over the RB is presented in FIG. 7 in terms of efficiency ratio 91 power ratio 92 and size ratio 93 versus number of stages 90. Note the size ratio 93 refers to first stage turbocompressor used in series in the MMEE system relative to the Brayton unit. The size of the second, third, and fourth turbocompressors 20,30,40, is usually small enough to become less significant relative to overall system weight (approximately 12% of Brayton unit weight). This assumes weight is proportional to size ratio raised to the 2.5 power. Also, the size ratio 93 applies to the regenerator, intercoolers and heater/reheaters. These ratios are based on the reduced weight flow requirements as specific power increases 92 with number of MMEE stages 90.

Figures 8, 8A:
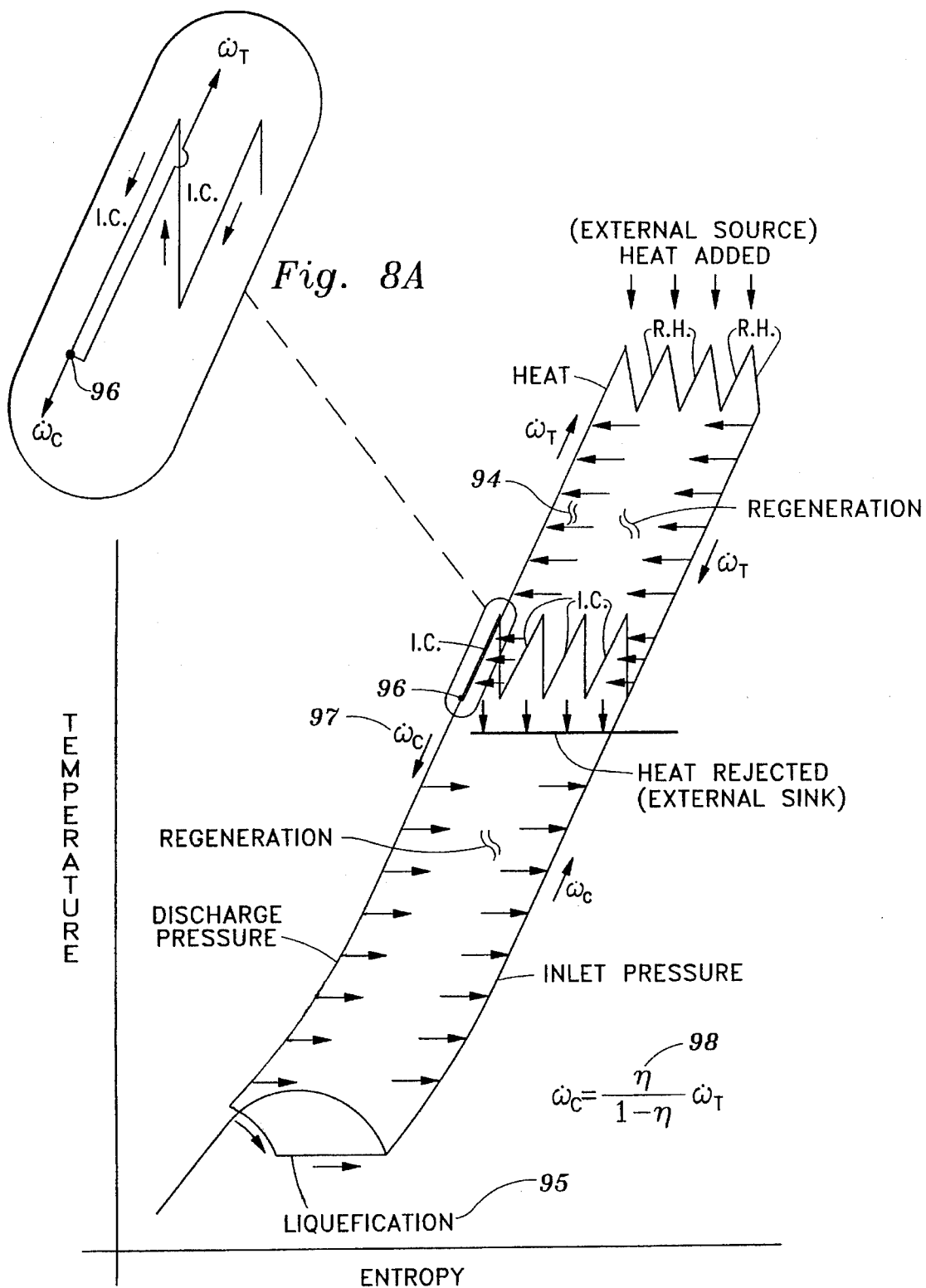
FIG. 8 is a graph illustrating the use of Modified Ericsson cycle for refrigeration applications, (an embodiment of this invention) i.e. helium liquefication.

Another embodiment of this invention applies to refrigeration applications. For illustrative purposes, a four (4) stage MMEE 94, FIG. 8, is used for helium liquefication 95. For this application power is not generated and the excess helium flow, not required to drive the turbines, is tapped-off at the last stage intercooler discharge 96. The amount that may be tapped-off 97 is a function of the cycle efficiency 98.

The cycle efficiencies and SPC for helium using low-technology components 107 are shown in FIG. 9. These results show the NRB cycle 102 (similar to the air/hot gas results 60), is non-competitive (<14%). Only the four (4) stage MMEE 106 is competitive in both efficiency (32%) and SPC (0.850).

Figure 10A:
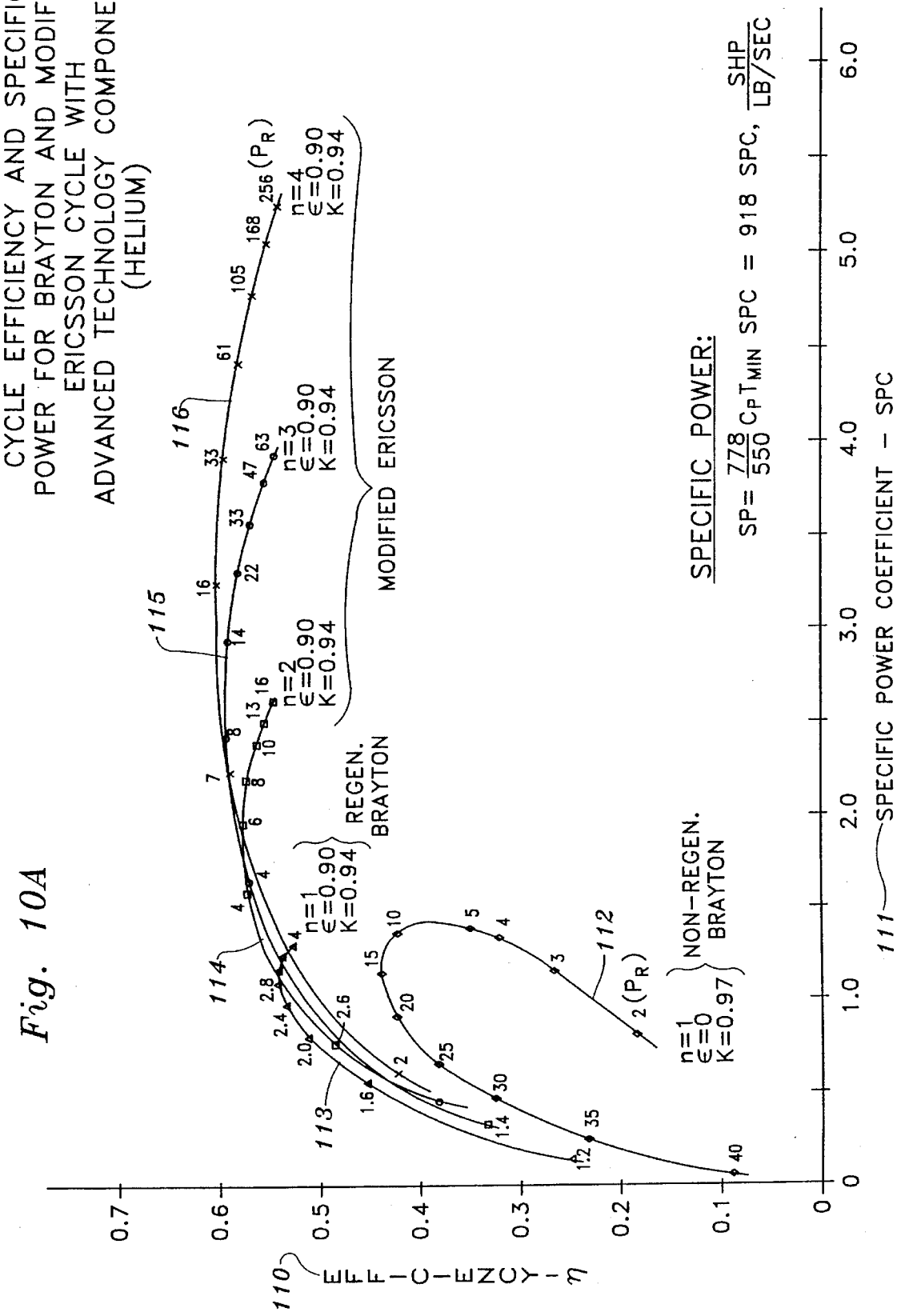
FIG. 10 is a graph illustrating the performance characteristics of Brayton and Modified Ericsson cycles for helium utilizing advanced technology components.

Using advanced-technology components 117 for helium, the results of MMEE 114,115,116, NRB 112 and RB 113, cycle efficiencies and SPC are shown in FIG. 10. The performance of MMEE 114,115,116 at maximum efficiency (60%, 62%, 63%) and corresponding SPC (1.9, 2.3, 3.1) are higher than RB 113 (56%, 1.1) and NRB 112 (45%, 1.1).

Another embodiment of this invention is a tip-turbine driven single stage compressor, FIG. 11. This design incorporates several features that are essential for achieving high efficiency in thermodynamic cycles such as the MMEE. These features include: (1) turbine and compressor aerodynamic designs in the optimum specific speed range (50 <$N_s$<300) for maximum efficiency, FIG. 2; (2) direct means for transpiration cooling the turbine rotor blades and stator for maximum turbine temperature operation (turbine cooling is optional); (3) turbine/compressor single piece rotor design having good casting characteristics, with the use of a low number of large blades (4 to 12) for high temperature nickel alloys or ceramic materials; and (4) mixed flow turbine and compressor design provides a gas flow path that permits efficient diffusion (pressure recovery) for the intercooling and reheat stages of the MMEE's and thus minimizes pressure flow losses detrimental to the cycle efficiency. In addition, the design incorporates a rotating one piece rotor mounted on bearings located in a warm environment (compressor inlet/discharge mean temperature) and are isolated from the high temperature turbine gases. This eliminates heat-soak-back problems such as lube oil coking or loss of rolling element bearing hardness due to excessive ball or race temperatures.

The cycle working fluid gas enters the compressor inlet housing 121 at low velocities (to minimize pressure losses) and is then accelerated through the inlet guide vanes 122 (these could also be variable for control purposes) prior to entering the compressor rotor full blades 123a and partial blades 123b. These blades add energy to the gas (imparting angular momentum) and raise the pressure to the static discharge level where the flow remains at high velocity. The flow then enters the stator vanes 124, 125 where the angular velocity component is removed and the flow is diffused to low axial velocities prior to exiting the discharge housing at 126.

High temperature hot gas enters the turbine inlet manifold 127 at low velocities and is accelerated to high velocities as it expands through the transpiration cooled turbine nozzle vanes 128 and drives the compressor rotor as the flow reacts with the cooled or uncooled turbine blades 129. The high velocity flow then exits the rotor and is diffused to low velocities in the turbine exhaust housing 120. Transpiration cooling of the turbine nozzle vanes and rotor blades, if selected, use the compressor discharge air bled through the rotor shroud 141 and the stator shroud 142.

In the application of this design to Brayton and Ericsson type cycles the pressure level of the turbine will be near the pressure level of the compressor. Therefore, the transpiration cooling of the rotor will be assisted by the pumping action of the shroud fed bleed holes in the turbine blades 129 since the blade velocities of the turbine 129 are greater than the compressor blade velocities 123. The transpiration cooling of the turbine nozzle may or may not require bleed from a higher pressure source, i.e. compressor discharge 126, this will depend upon the static pressure match between stator 124 and nozzle 128.

Critical hot sections of the turbine may be cooled or uncooled as noted above or these components can be fabricated from a high temperature ceramic material. The compressor and turbine can be a one-piece ceramic rotor or a combination ceramic turbine and nickel alloyed compressor rotor. The two piece rotor is bonded together by means of a braze joint along the compressor rotor tip shroud 145 or mechanically attached by bolts or rivets.

The leakage between the turbine and compressor rotor flow paths is controlled by two non-rubbing labyrinth type seals located at the rotor shroud inlet 139 and discharge 140. The labyrinth teeth 143 are plasma sprayed with a hard material such as tungsten carbide to permit wear-in rubbing and operation at minimum clearances.

The single piece compressor/turbine rotor is mounted on two separate bearings 131,132 located outboard of an axis of rotation of the rotor 44 and adjacent the inlet guide vanes 122 and compressor discharge stator vanes 124, respectively.

Radial loads generated by the rotor 144 are reacted by the radial bearing 131 132. The axial loads generated by the rotor 144 are reacted by the thrust bearing 133. These bearings are shown as compliant hydrodynamic type and lubricated with the compressor gas. Other types of bearings can also be used and include, oil lubricated hydrodynamic, or rolling element.

Output power is transmitted externally by means of the drive shaft 134 that is coupled to the compressor/turbine rotor spline 135. A shaft seal 136 is positioned at the compressor inlet housing 121.

Figure 12:
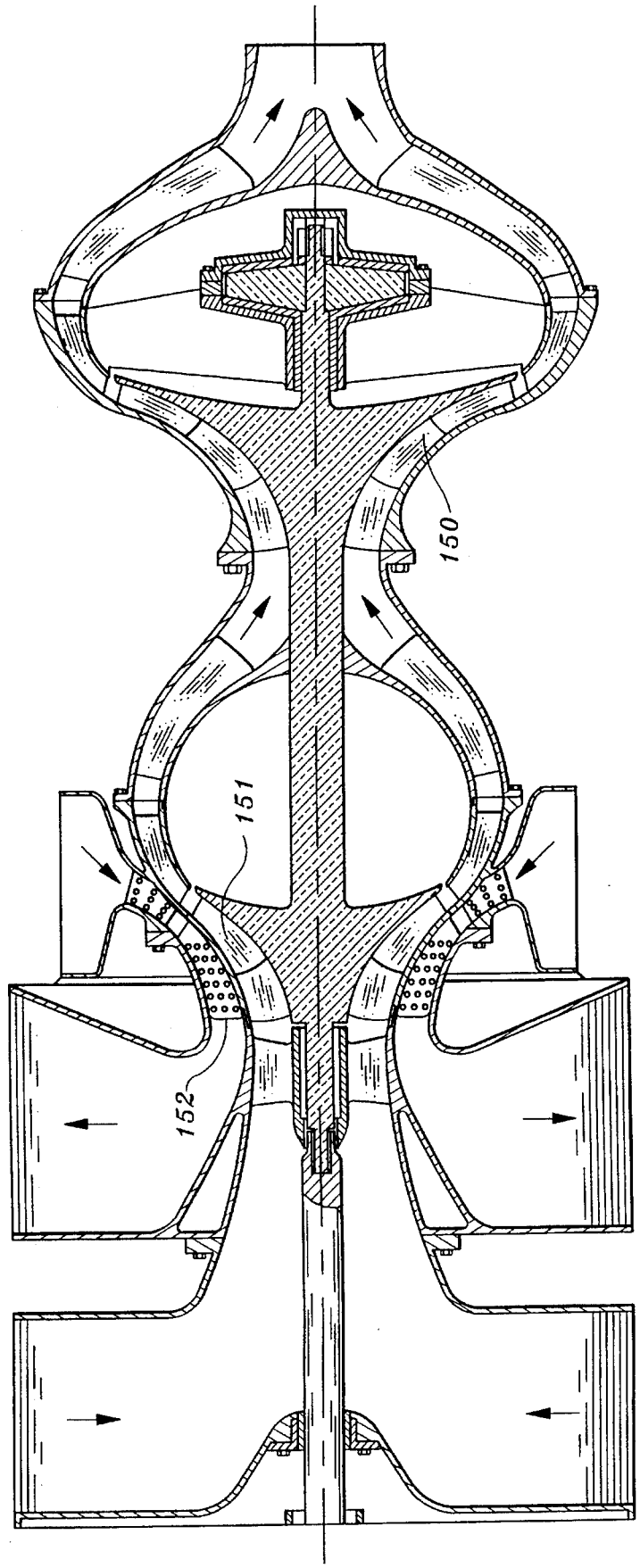
FIG. 12 is a full sectional view of the transpiration cooled or ceramic tip-turbine driven two stage compressor (an embodiment of this invention).

A tip-turbine driven two stage compressor is shown in FIG. 12. This design is very similar to the single stage compressor design shown in FIG. 11 except the second stage compressor 150 generates higher pressure ratios than the first stage 151 by eliminating the tip-turbine 152. The need for a two stage compressor arises when the working fluid is a low molecular weight gas such as helium. Typical pressure ratios for a compressor pumping helium at a mean impeller tip speed of 1100 ft/sec (approximate first stage limit) is 1.14, while the same impeller pumping air at the same tip speed would be 2.37. Therefore, it takes approximately six more stages to compress helium to the same pressure ratio at this tip speed as it does to compress air. Utilizing a second stage compressor, as shown in FIG. 12, operating at a tip speed of 1800 ft/sec, the pressure ratio developed is 1.40 and the combined two stage pressure ratio is 1.14×1.40=1.60. This is a much more favorable pressure ratio for helium. At a system pressure ratio of 16, the maximum cycle efficiency of curve 116 FIG. 10, approximately six (6) two stage units similar to that shown in FIG. 12, are required.

Figure 13:
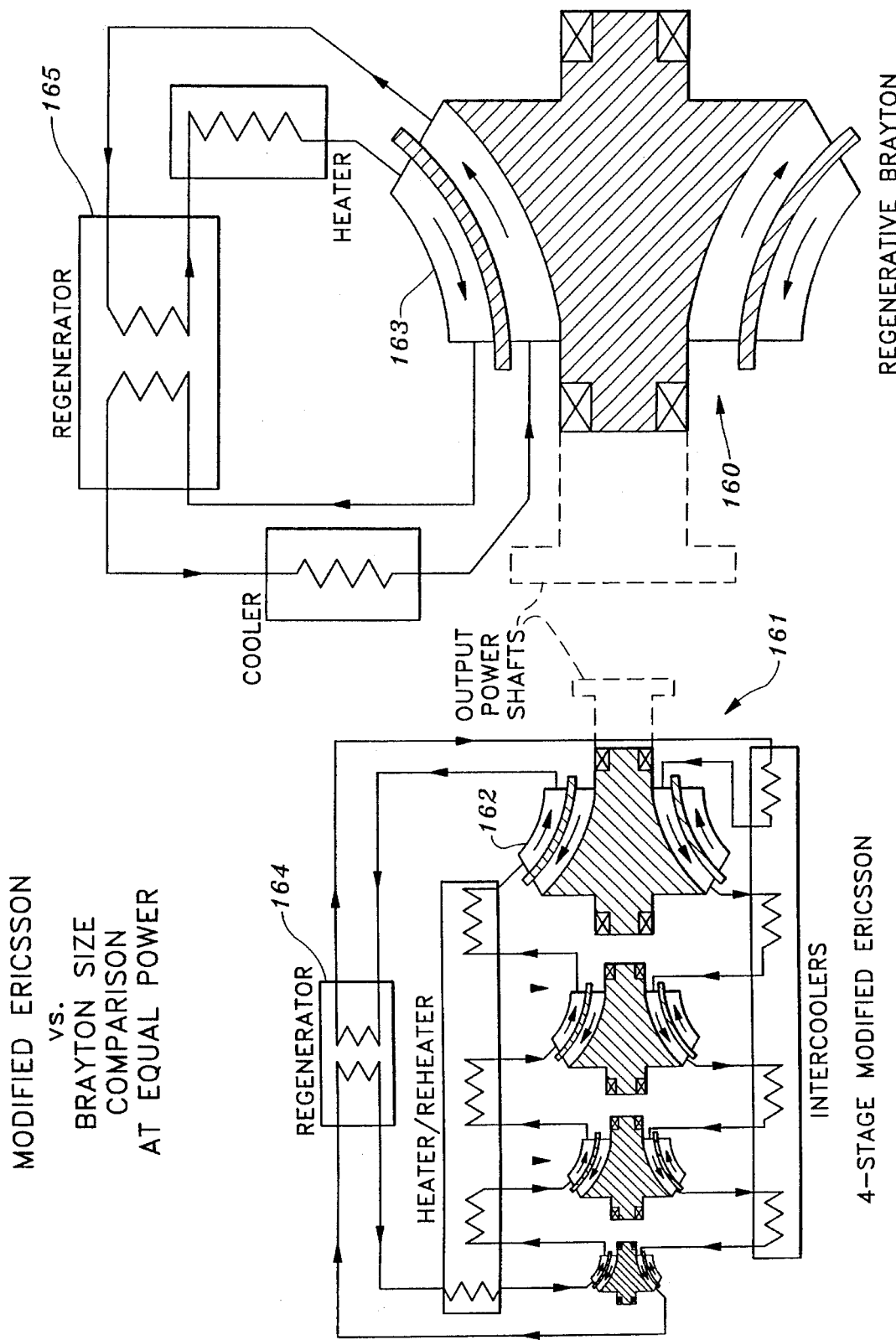
FIG. 13 illustrates the tip-turbine driven compressor flow schematic for Brayton and Ericsson power cycles (an embodiment of this invention).

A flow schematic of a Brayton engine 160 and MMEE 161 utilizing the tip-turbine driven single stage compressor is included in FIG. 13. The actual relative sizes of the turbocompressors for the two systems is illustrated when both produce the same power. Note the first stage turbocompressor 162 of the MMEE 161 is approximately one-half the size of the Brayton turbocompressor 163 and the same is true for the regenerators 164 and 165. This reduction in size results because the system weight flow rate of the MMEE is ¼ that of the Brayton engine for similar turbocompressor pressure ratios.

Figure 14:
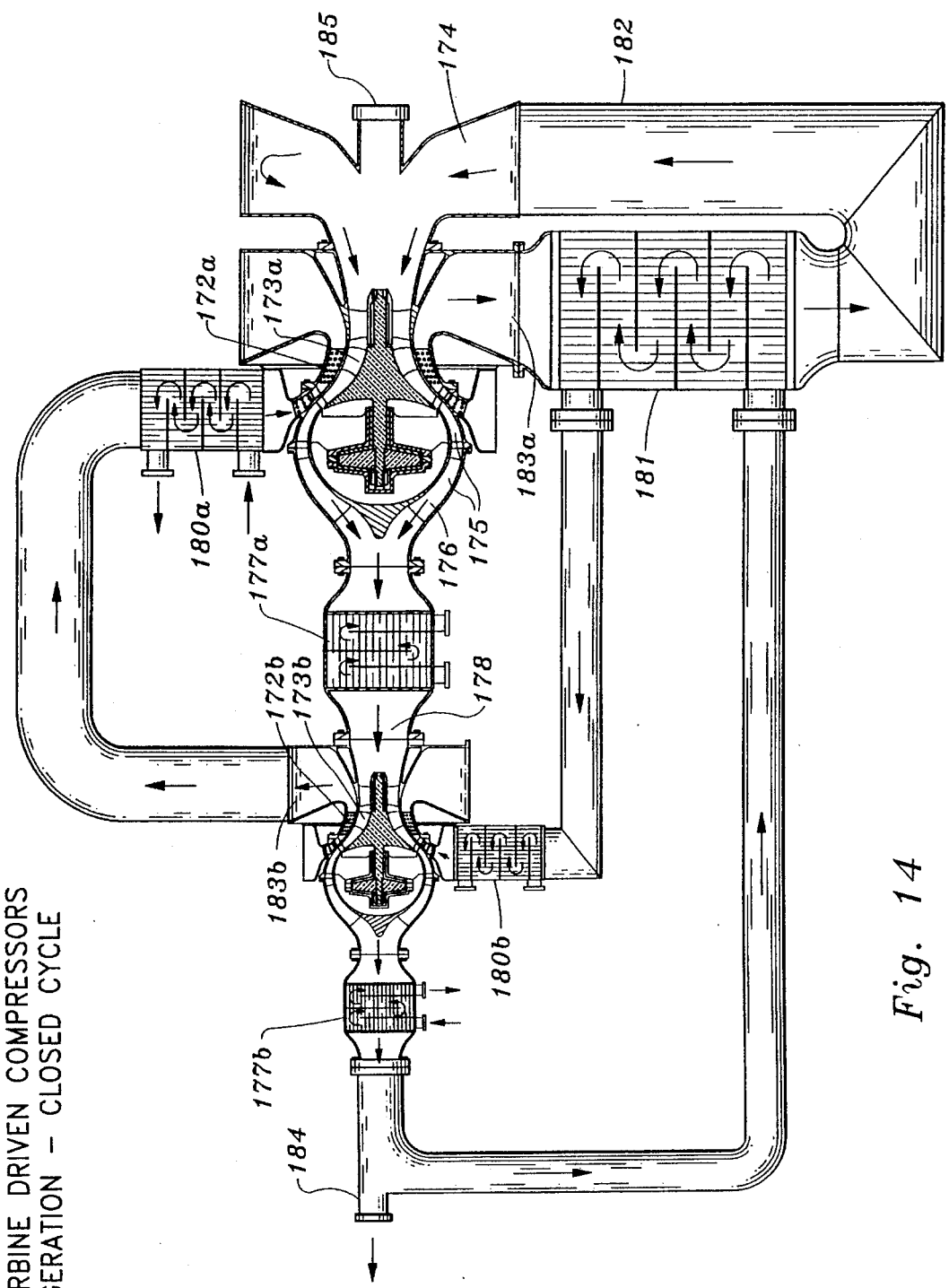
FIG. 14 is a full sectional view of the two stage closed cycle Modified Ericsson engine with tip-turbine driven compressors for refrigeration application (an embodiment of this invention).

A closed cycle two stage Modified Ericson cycle utilizing the tip-turbine driven compressor design is illustrated in FIG. 14. This system would be applicable for refrigeration of higher molecular weight gases such as air, nitrogen, oxygen, carbon dioxide, etc. The working fluid gas from refrigerant return line 185 and regenerator low pressure exhaust duct 182 enters the first stage turbocompressor inlet housing 174 and rotor 173a. The gas is compressed by the rotor blade/flow interaction, turned and diffused by stators 175, and discharged into the first stage intercooler 177a. The heat of compression is removed by the intercooler and the gas then enters the second stage rotor 173b where the gas pressure is raised by approximately the same pressure ratio as the first stage and discharged into the second stage intercooler 177b, where the heat of compression is again removed. At this point the gas is at its maximum pressure and minimum temperature and a portion of the gas, 184 not needed to drive the turbines, is tapped-off for refrigeration purposes as illustrated in FIG. 8. The high pressure cool gas exiting intercooler 177b enters the regenerator 181 and absorbs the heat from the first stage turbine exhaust discharging through housing 183a. The high pressure hot gas exiting the regenerator 181 is heated to its maximum allowable temperature by the second stage heater 180b and then drives the second stage turbine blades 172b and exhausts through turbine housing 183b. The gas then enters the first stage reheater 180a where the heat removed by the second stage turbine is replenished. The hot gas then drives the first stage turbine and exhausts into the turbine exhaust housing 183*a* and enters the regenerator 181 where it transfers heat to the compressor discharge gas as noted above. The cool turbine exhaust is returned to the first stage compressor inlet 174 via duct 182 where it combines with the refrigerant gas being returned through duct 185 and the cycle is repeated.

Figure 15:
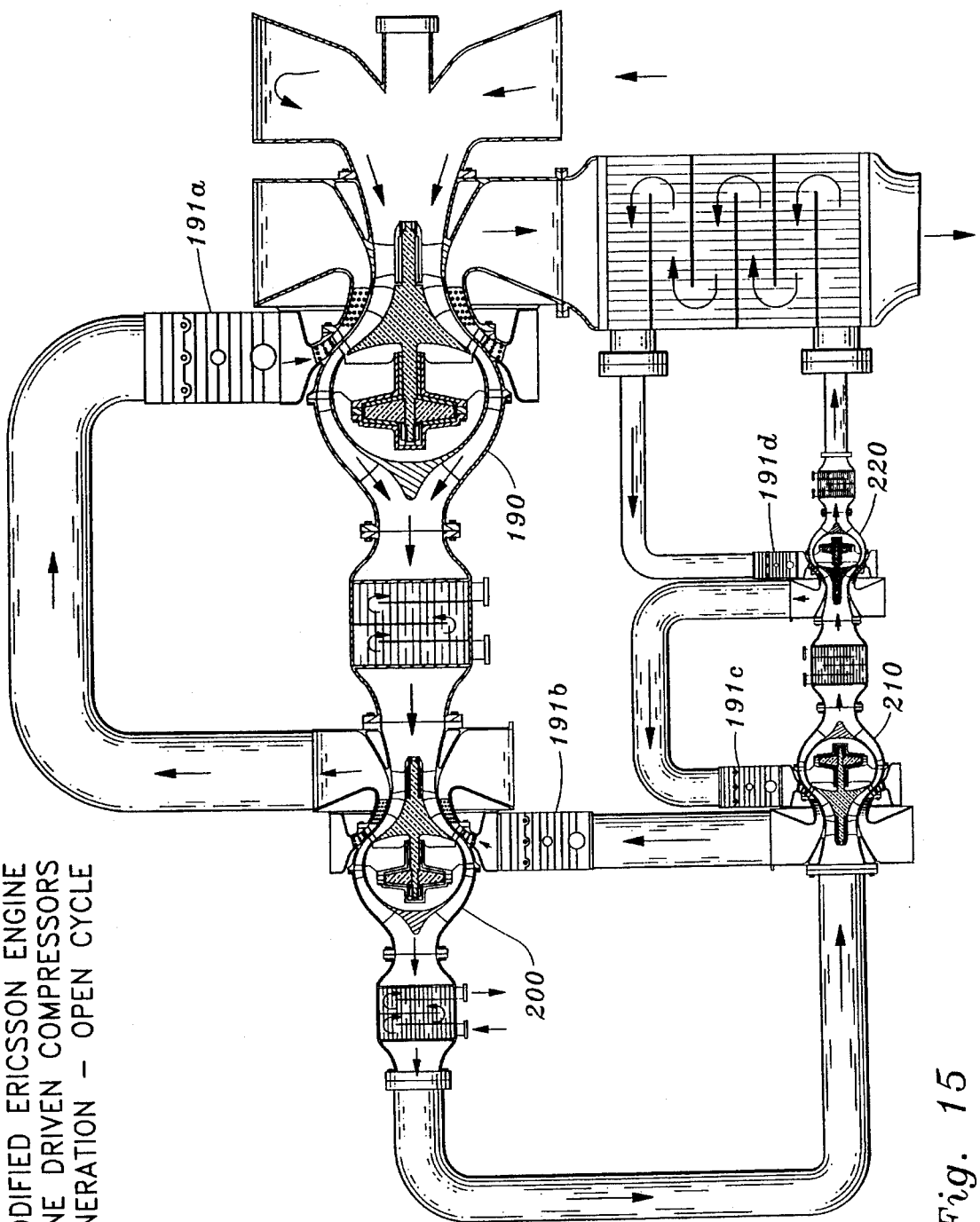
FIG. 15 is a full sectional view of a four stage open cycle Modified Ericsson engine with tip-turbine driven compressors for power generation (an embodiment of this invention).

A four stage MMEE 190,200,210,220 open cycle using the tip-turbine driven single stage compressor is illustrated in FIG. 15. This engine depicts a maximum efficiency, maximum power density unit for power generation applications. The heaters and preheaters are fuel fed gas generators, 191*a*,191*b*,191*c*,191*d*, similar to those used in aircraft and commercial gas turbines.

Figure 16:
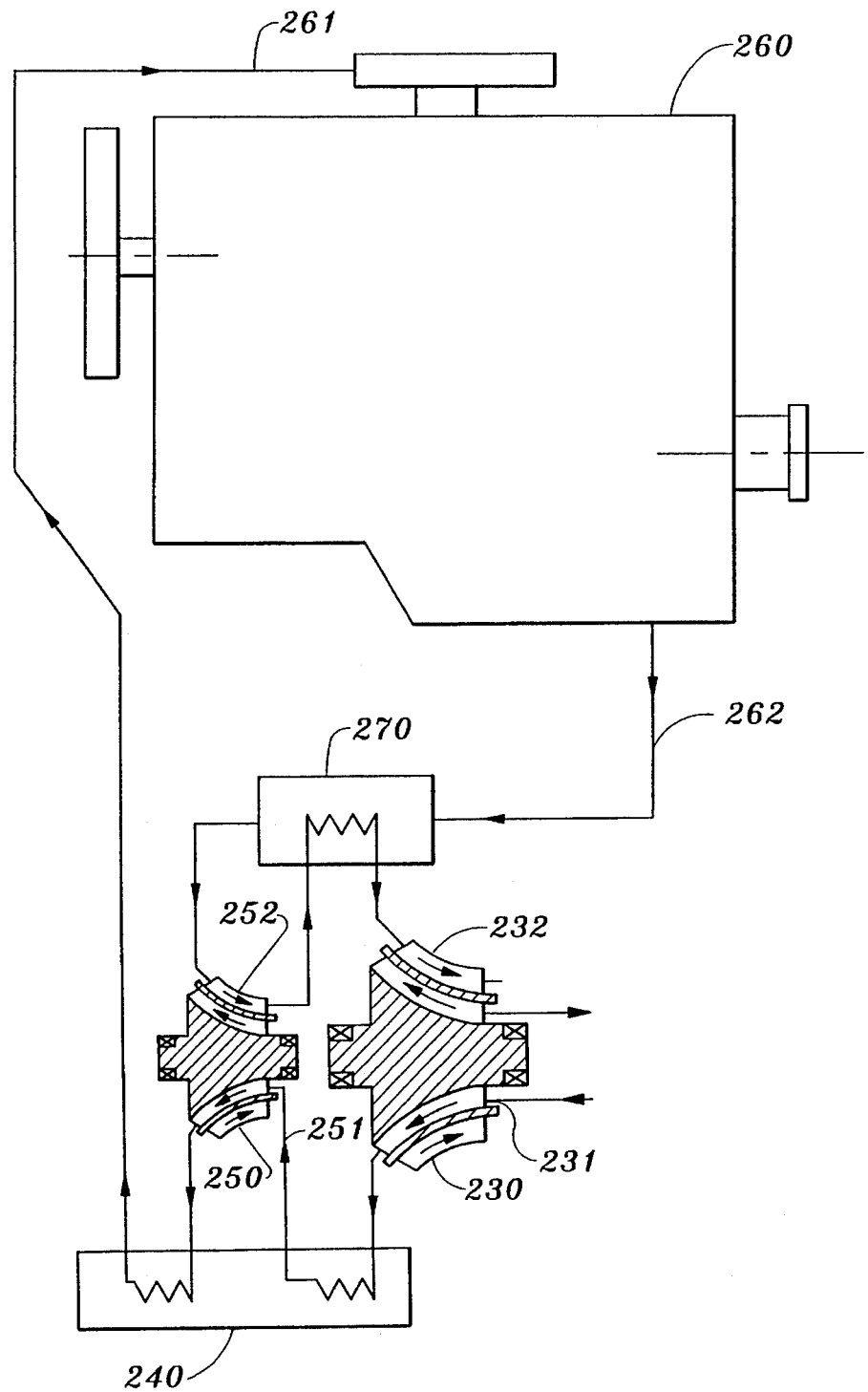
FIG. 16 illustrates the tip-turbine driven compressor flow schematic for automotive supercharger application (an embodiment of this invention).

Another embodiment of this invention is the application of tip-turbine driven compressors for automotive/diesel supercharging, as illustrated in FIG. 16. A two stage supercharger version for pressure ratios of approximately four (4) is shown. The system consists of a first stage turbocompressor 230, intercooler 240, second stage turbocompressor 250, automotive/diesel engine 260 and reheater 270. For a single stage supercharger, (pressure ratio of approximately two (2)) the second stage turbocompressor 250 and reheater 270 can be eliminated. Air enters the first stage compressor 231, discharges at a higher pressure into an intercooler 240 and cooled to the same inlet temperature as the gas at 231. The air then enters the second stage compressor 252 and is compressed again to the same pressure ratio as the first stage, discharges into the same intercooler 240 (a separate unit can also be used) and also cooled to the inlet temperature at 231. The high pressure cool air then enters the automotive/diesel inlet air supply system 261 for subsequent compression and combustion. The engine exhaust gas 262 enters reheater 270 where it gives up some heat to the second stage turbine exhaust and then drives the second stage turbine 252. This method of reheating the second stage turbine exhaust with the incoming engine exhaust gases has two benefits. It reduces the temperature of the second stage turbine to permit the use of lower cost materials and secondly it raises the temperature of the first stage turbine for higher work output. The reheated gas exiting reheater 270 then drives the first stage turbine 232 and exhausts into the atmosphere.

I claim:

1. A tip-turbine driven single stage compressor comprising in combination:

a rotor means having a rotational axis, a shroud radially spaced from said rotational axis, a plurality of compressor blades along an inner surface of said rotor shroud and a plurality of turbine blades along an outer surface of said shroud, said compressor blades adapted to receive low pressure gas flow at an inlet and discharge the flow at a mean radius not less than a mean radius of said inlet, said shroud having an inlet close clearance dynamic seal and a discharge close clearance dynamic seal, and said shroud having a means for cooling said turbine blades with gases passing through at least one cooling passage passing from said inner surface of said shroud to said outer surface of said shroud;

said turbine blades adapted to receive gas flow at a tip-turbine inlet and discharge the flow at a mean radius not greater than an inlet mean radius and having a meridional flow oriented in a contra-direction to a compressor meridional flow;

a radial bearing means and a thrust bearing means for supporting said rotor;

a compressor inlet housing means adapted to accept inlet compressor flow at velocities below a Mach number of 0.25 from a supply means and gradually accelerate the flow to a plurality of movable or stationary inlet guide stator vanes;

a compressor discharge housing means with a plurality of stator vanes adapted to accept and diffuse it to velocities below a Mach number of 0.25, said stator vanes having a stator shroud adjacent a radial periphery thereof, said stator shroud including means to supply compressor discharge gas for cooling turbine nozzle vanes through passages in said stator shroud;

a turbine inlet housing means adapted to accept gas at velocities below Mach number 0.25 from a supply of hot gas and gradually accelerate the gas to a plurality of turbine nozzle vanes where the is further accelerated prior to entering the turbine rotor blades; and a turbine exhaust housing means adapted to accept gas and gradually decelerate the gas to velocities below a Mach number of 0.25.

2. A tip-turbine driven multi-stage compressor as set forth in claim 1 and further comprising:

at least one additional compressor stage, adapted and driven by said tip-turbine of said first stage compressor by means of a common shaft, each said additional compressor stage being of similar design as said first stage compressor but including larger discharge diameter and exhibiting a higher discharge tip speed.

3. The tip-turbine driven compressor of claim 2, further including an input with a means to receive gas from a supply means and means to direct said gas into said compressor inlet housing means, and a discharge with a with a means to direct said gas out of said compressor discharge housing means, a regenerator means having a high pressure gas inlet in fluid communication with a high pressure gas outlet, said high pressure gas inlet including a means to receive said gas from said tip-turbine driven compressor discharge, said regenerator means including means to heat said gas passing into said high pressure gas inlet;

a heater means including a means for receiving said gas from said regenerator means high pressure gas outlet and a heater outlet, said heater means including a means for heating of said gas;

said turbine inlet housing means including a means for receiving said gas from said heater outlet;

said turbine exhaust housing means including a means to direct said gas out of said turbine at a low pressure exhaust;

said regenerator means further including means to receive exhaust from said turbine exhaust housing at a low pressure inlet in fluid communication with a low pressure outlet, and means to transfer heat from said gas at said low pressure exhaust to said gas between said high pressure gas inlet and said high pressure gas outlet;

an intercooler means including means for receiving said gas from said regenerator low pressure outlet, an output, and means to cool said gas;

a return duct including means for receiving said gas from said intercooler output and means for returning said gas to said tip-turbine driven compressor; and a means for extracting a portion of said gas from a highest pressure compressor discharge, and means for return of said extracted gas to said first stage compressor supply means.

4. The tip-turbine driven compressor of claim 1 further including an input with means to receive gas from a supply means and means to direct said gas into said compressor inlet housing means, and having a discharge with a means to direct said gas out of said compressor discharge housing means, said tip-turbine driven compressor including a means to raise the pressure of said gas to a value greater than at said input;

an intercooler including means for receiving said gas from said compressor discharge, and an output, said intercooler means including means to cool said gas;

an internal combustion engine means including means for receiving said gas from said intercooler output at a combustion region thereof and having a hot gas outlet;

said tip-turbine including a means for receiving said gas from said hot gas outlet at said turbine inlet housing means and having an exhaust coupled to said turbine exhaust housing means.

5. The tip-turbine driven compressor of claim 4 further including an input with means to receive gas from a supply means and means to direct said gas into said compressor inlet housing means, and having a discharge with a means to direct said gas out of said compressor discharge housing means, said tip-turbine driven compressor including a means to raise the pressure of said gas to a value greater than at said input;

a first stage intercooler means including means for receiving said gas from said tip-turbine driven compressor discharge, and a first stage output, said first stage intercooler means including means to cool said gas;

a second stage tip-turbine driven compressor means having a second stage input adapted to receive gas from said first stage intercooler output and a second stage discharge, said second stage tip-turbine driven compressor including means to raise the pressure of said gas to a value greater than at said second stage input;

a second stage intercooler means including means for receiving said gas from said second stage compressor discharge and a second stage output, said second stage intercooler means including means to cool said gas;

an internal combustion engine means including means for receiving said gas from said second stage intercooler output at a combustion region thereof and having a hot gas outlet;

a reheater means including means for receiving the internal combustion engine hot gas at said hot gas outlet a means to transfer heat from said hot gas, and having a cooled gas output;

a second stage tip-turbine means including means for receiving the gas from said reheater output and having a second stage exhaust, said second stage tip-turbine means including means to drive said second stage compressor;

said second stage tip-turbine exhaust coupled to said reheater means such that said means to transfer heat from said hot gas transfers heat into the gas exhausted by said second stage tip-turbine exhaust between said second stage tip-turbine exhaust and a heated gas output;

a first stage tip-turbine means including means for receiving said gas from said reheater heated gas output and a first stage exhaust, said first stage tip-turbine means adapted to drive said first stage compressor.

6. A Brayton cycle gas power system comprising:

a tip-turbine driven single stage compressor including:

a rotor means having a rotational axis, a shroud radially spaced from said rotational axis, a plurality of compressor blades along an inner surface of said rotor shroud and a plurality of turbine blades along an outer surface of said shroud, said compressor blades adapted to receive low pressure gas flow at an inlet and discharge the flow at a mean radius not less than a means radius of said inlet, said shroud having an inlet close clearance dynamic seal and a discharge close clearance dynamic seal, and said shroud having a means for cooling said turbine blades with gases passing through at least one cooling passage passing from said inner surface of said shroud to said outer surface of said shroud;

said turbine blades adapted to receive gas flow at a tip-turbine inlet and discharge the flow at a mean radius not greater than an inlet mean radius and having a meridional flow oriented in a contra-direction to a compressor meridional flow;

a radial bearing means and a thrust bearing means for supporting said rotor;

a compressor inlet housing means adapted to accept inlet compressor flow at velocities below a Mach number of 0.25 from a supply means and gradually accelerate the flow to a plurality of movable or stationary inlet guide stator vanes, a compressor discharge housing means with a plurality of stator vanes adapted to accept the compressor discharge flow and diffuse it to velocities below a Mach number of 0.25, said stator vanes having a stator shroud adjacent a radial periphery thereof, said stator shroud including means to supply compressor discharge gas for cooling turbine nozzle vanes through passages in said stator shroud;

a turbine inlet housing means adapted to accept the hot gas flow at velocities below Mach number 0.25 from a supply of hot gas and gradually accelerate the flow to a plurality of turbine nozzle vanes where the flow is further accelerated prior to entering said turbine rotor blades; and a turbine exhaust housing means adapted to accept the turbine rotor discharge flow and gradually decelerate the flow to velocities below a Mach number of 0.25, and said compressor inlet housing means adapted to receive gas from a supply and having a discharge, said tip-turbine driven compressor including a means to raise the pressure of said gas to a value greater than at said input;

a regenerator means having a high pressure gas inlet in fluid communication with a high pressure gas outlet, said high pressure gas inlet adapted to receive gas from said tip-turbine driven compressor discharge, said regenerator means including means to heat said gas passing into said high pressure gas inlet; and a heater means including a means for receiving said gas from said high pressure regenerator gas outlet and a heater outlet, said heater means including a means for variable heating of said gas;

said heater outlet in fluid communication adjacent said turbine inlet housing means, said tip-turbine adapted to drive said compressor means;

said regenerator means including means to receive gas exiting from said turbine exhaust housing means, means to transfer heat from gas exiting said turbine exhaust housing means to said gas between said high pressure gas inlet and said high pressure gas outlet, and having a low pressure outlet.

7. The gas power system of claim 6 wherein a return duct means is interposed between said low pressure outlet of said regenerator means and said compressor inlet housing means, and wherein an intercooler means is interposed between said compressor discharge housing means of a highest pressure compressor and said high pressure gas inlet of said regenerator means.

8. The gas power system of claim 6 wherein at least one additional tip-turbine driven compressor is interposed between said compressor discharge housing means and said high pressure inlet of said regenerator means, and wherein an intercooler means is interposed between each said tip-turbine driven compressor, said additional tip-turbine driven compressors having a turbine inlet housing means oriented downstream from a reheater means including a means for receiving gas from said turbine exhaust housing means of another said turbine and a means for variable heating of said gas.

9. The gas power system of claim 6 wherein said turbine blades of said tip-turbine driven single stage compressor include said cooling passages passing through an interior of said turbine blades and exiting said interior of said turbine blades through a plurality of bleed holes distributed along flow surfaces of said turbine blades, whereby gas from a side of said shroud adjacent said inner surface of said shroud can cool said turbine blades, and wherein said turbine nozzle vanes include a plurality of cooling passages oriented within an interior thereof and having a inlet in fluid communication with a side of said stator shroud adjacent said stator vanes and having an outlet distributed along the nozzle vane flow surfaces.

10. A Modified Ericsson cycle gas power system comprising in combination:

a first stage compressor means having a first stage compressor input adapted to receive gas from a supply and a first stage compressor discharge, said first stage compressor including a means to raise a pressure of said gas to a value greater than at said first stage compressor input;

a first stage intercooler means including means for receiving said gas from said first stage compressor discharge, and a first stage intercooler output, said first stage intercooler means including means to cool said gas;

a second stage compressor means having a second stage compressor input adapted to receive gas from said first stage intercooler output and a second stage compressor discharge, said second stage compressor including a means to raise the pressure of said gas to a value greater than at said second stage compressor input;

a second stage intercooler means including means form receiving said gas from said second stage compressor discharge, and a second stage intercooler output, said second stage intercooler means including means to cool said gas;

a regenerator means having a high pressure gas inlet in fluid communication with a high pressure gas outlet, said high pressure gas inlet adapted to receive gas from said second stage intercooler output, said regenerator means including means to heat said gas passing into said high pressure gas inlet;

a second stage heater means including a means for receiving said gas from said high pressure gas outlet of said regenerator means and a second stage heater outlet, said second stage heater means including a means for variable heating of said gas;

a second stage turbine means including a means for receiving said gas from said second stage heater outlet and a second stage turbine exhaust, said second stage turbine means adapted to drive said second stage compressor;

a first stage heater means including a means for receiving said gas from said second stage turbine exhaust and a first stage heater outlet, said first stage heater means including a means for variable heating of said gas;

a first stage turbine means including a means for receiving said gas from said first stage heater outlet and having a first stage turbine low pressure exhaust, said first stage turbine means adapted to drive said first stage compressor means;

said regenerator means including a means of receiving said gas from the first stage turbine low pressure exhaust in fluid communication with a regenerator low pressure outlet, means to transfer heat contained in said gas at said first stage turbine low pressure exhaust to said gas between said high pressure gas inlet and said high pressure gas outlet;

a return duct means for receiving said gas from said regenerator low pressure outlet and returning said gas to said supply;

wherein at least one of said compressor means is a centrifugal compressor having a compressor inlet housing means receiving gas to be compressed to a higher pressure therein and a compressor discharge housing means adapted to discharge gas after compression by said centrifugal compressor, said compressor inlet housing means providing a gas flow average diameter less than a gas flow average diameter of said compressor discharge housing means, said compressor including a rotor having a plurality of compressor blades extending radially outwardly from a rotational axis of said rotor means, said rotor means rotatably supported by a radial bearing means and a thrust bearing means;

a plurality of stator vanes oriented downstream from said rotor and;

wherein said rotor includes a shroud surrounding said rotor at a periphery of said compressor vanes distant from said rotational axis, said shroud having an inner surface adjacent said compressor blades and an outer surface on a side of said shroud opposite said inner surface, said outer surface supporting a plurality of turbine blades thereon, and a turbine inlet housing means supporting a plurality of turbine nozzle vanes upstream from said turbine blades.

11. The gas power system of claim 6 wherein each said tip-turbine driven compressor includes an additional compressor rotor fixedly attached to said rotor means, said additional compressor rotor having a plurality of compressor blades.

12. The system of claim 10 wherein at least one additional compressor is interposed between said first stage compressor and said second stage compressor, wherein at least one additional intercooler is interposed between said first stage compressor and said second stage compressor, wherein at least one additional turbine is interposed between said first stage turbine and said second stage turbine, and wherein at least one additional reheater is interposed between said first stage turbine and said second stage turbine.

13. A modified Ericsson cycle gas power system including:

a first stage compressor including means to raise a pressure of a gas passing therethrough and having an inlet and a discharge, a first stage intercooler including means to cool the gas passing therethrough, a last stage compressor including means to raise a pressure of the gas passing therethrough and having an inlet and a discharge, said first stage intercooler interposed in fluid communication between said discharge of said first stage compressor and said inlet of said last stage compressor, a regenerator having a high pressure pathway and a low pressure pathway, said regenerator including means to exchange heat between said pathways, a last stage heater including means to elevate a temperature of the gas passing therethrough, said regenerator having said high pressure pathway interposed in fluid communication between said discharge of said last stage compressor and said last stage heater, a last stage turbine including means to cause said last stage compressor to rotate and including an input and an exhaust, a first stage heater including means to elevate a temperature of the gas passing therethrough, a first stage turbine including means to cause said first stage compressor to rotate and including an input and an exhaust, said first stage heater interposed between said exhaust of said last stage turbine and said input of said first stage turbine, said last stage heater interposed between said high pressure pathway of said regenerator and said last stage turbine, at least one of said compressors including a rotor having a rotational axis and a plurality of compressor blades extending radially away from said rotational axis, said rotor having a greater outer diameter adjacent said discharge than adjacent said inlet, at least one of said turbines including a plurality of turbine blades having a rotational axis co-linear with said rotational axis of one of said compressors, said turbine blades oriented closer to said rotational axis adjacent said exhaust than adjacent said input, and at least one of said means to cause said compressor to rotate including a shroud having an inner surface and an outer surface, said inner surface fixedly attached to a periphery of said compressor blades and said outer surface fixedly attached to said turbine blades, such that said turbine causes said compressor to rotate.

14. The system of claim 13 wherein a last stage intercooler is interposed between said discharge of said last stage compressor and said high pressure pathway of said regenerator, said last stage intercooler including means to cool the gas passing therethrough, and wherein said exhaust of said last stage turbine directs the gas exhausted therefrom through said low pressure pathway of said regenerator and through a return duct interposed between said low pressure pathway of said regenerator and said inlet of said first stage compressor.

15. The system of claim 13 wherein at least one additional stage is interposed into said system with said first stage compressor, said first stage intercooler, said first stage heater and said first stage turbine on a first side thereof and said last stage compressor, said last stage intercooler, said last stage heater and said last stage turbine on an opposite side thereof, each said additional stage including:

an additional stage compressor interposed in fluid communication between said first stage intercooler and an additional stage intercooler, said additional stage intercooler interposed in fluid communication between a discharge of said additional stage compressor and said inlet of said last stage compressor, an additional stage turbine interposed in fluid communication between art additional stage reheater and said first stage reheater, and said additional stage reheater interposed in fluid communication between said exhaust of said last stage turbine and said input of said additional stage turbine.

16. The system of claim 13 wherein said turbine blades include flow surfaces having a plurality of bleed holes thereon said bleed holes in fluid communication with cooling passages passing through said shroud, whereby compressor gas flow can pass through said cooling passages and cool said turbine blades.

17. The system of claim 13 wherein each said compressor includes a plurality of stationary stator vanes oriented downstream from said rotor, said stator vanes extending substantially radially away from said rotational axis of said rotor and having a stator shroud at a periphery of said stator vanes, said stator shroud having an inner surface adjacent said stator vanes and an outer surface, surface outer surface supporting a plurality of turbine nozzle vanes extending substantially radially away from said rotational axis, said turbine nozzle vanes fixedly attached to said stator shroud, said turbine nozzle vanes including a plurality of bleed holes oriented thereon and in fluid communication with cooling passages passing through said stator shroud, whereby gases exiting said discharge of said compressor are partially diverted through said cooling passages and out of said turbine nozzle vanes to cool said turbine nozzle vanes.

18. The system of claim 13 wherein said rotor of at least one of said compressors includes a shaft oriented along said rotational axis, said shaft rotatably supported by a plurality of radial bearings, one said radial bearing upstream from said rotor and one said bearing downstream from said rotor, said shaft supported from axial motion buy a thrust bearing oriented downstream from said rotor, said thrust bearing and said radial bearings including lubrication means, said lubrication means including gas from said compressor therein.

19. A tip-turbine driven single stage compressor comprising in combination:

a rotor means having a rotational axis, a shroud radially spaced from said rotational axis, a plurality of compressor blades along an inner surface of said rotor shroud and a plurality of turbine blades along an outer surface of said shroud, said compressor blades including means to receive low pressure gas flow at an inlet and discharge the flow at a mean radius not less than a mean radius of said inlet, said shroud having an inlet close-clearance dynamic seal and a discharge close-clearance dynamic seal, said turbine blades including means to receive gas flow at a tip-turbine inlet and discharge the flow at a mean radius not greater than a mean radius of said tip-turbine inlet, a bearing means for supporting said rotor;

a compressor inlet housing means adjacent said inlet close-clearance dynamic seal and including means to accept inlet compressor flow from a supply means;

a compressor discharge housing means adjacent said discharge close-clearance dynamic seal and including means to accept the compressor discharge flow;

a turbine inlet housing means adjacent said rotor and including means to accept gas flow from a supply of gas and direct the flow to a plurality of turbine nozzle vanes where the flow is accelerated prior to entering said turbine rotor blades; and a turbine exhaust housing means adjacent said rotor and including means to accept the turbine rotor discharge flow.

20. The compressor of claim 19 wherein said shroud includes means for cooling said turbine blades with gasses passing through at least one cooling passage passing from said inner surface of said shroud to said outer surface of said shroud.

21. The compressor of claim 20 wherein said compressor inlet housing means includes a plurality of inlet guide stator vanes, said stator vanes including a stator shroud adjacent a radial periphery thereof, said stator shroud including means to supply compressor discharge gas for cooling turbine nozzle vanes through passages in said stator shroud.

* * * * *